US012700971B2

(12) United States Patent
Lin et al.

(10) Patent No.: US 12,700,971 B2
(45) Date of Patent: Aug. 4, 2026

(54) METHOD AND USER EQUIPMENT FOR HANDLING RADIO RESOURCE COLLISION

(71) Applicant: SHARP KABUSHIKI KAISHA, Sakai City (JP)

(72) Inventors: Wan-Chen Lin, Taipei (TW); Chia-Hao Yu, Taipei (TW); Chia-Hung Lin, Taipei (TW); Hai-Han Wang, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 213 days.

(21) Appl. No.: 18/281,055

(22) PCT Filed: Mar. 31, 2022

(86) PCT No.: PCT/CN2022/084467
§ 371 (c)(1),
(2) Date: Sep. 8, 2023

(87) PCT Pub. No.: WO2022/206899
PCT Pub. Date: Oct. 6, 2022

(65) Prior Publication Data
US 2024/0089062 A1 Mar. 14, 2024

Related U.S. Application Data

(60) Provisional application No. 63/169,825, filed on Apr. 1, 2021.

(51) Int. Cl.
*H04L 5/00* (2006.01)
*H04W 72/21* (2023.01)
(52) U.S. Cl.
CPC .......... *H04L 5/0053* (2013.01); *H04L 5/0094* (2013.01); *H04W 72/21* (2023.01)

(58) Field of Classification Search
None
See application file for complete search history.

(56) References Cited

U.S. PATENT DOCUMENTS

| | | | | |
|---|---|---|---|---|
| 11,576,228 B2 * | 2/2023 | Yang | | H04L 1/1614 |
| 2018/0167933 A1 * | 6/2018 | Yin | | H04L 5/0055 |

(Continued)

FOREIGN PATENT DOCUMENTS

| | | |
|---|---|---|
| CN | 112534927 A | 3/2021 |
| WO | 2020198645 A1 | 10/2020 |
| WO | 2020198667 A1 | 10/2020 |

OTHER PUBLICATIONS

Qualcomm Incorporated, "Multi-TRP Enhancements", R1-1905026, 3GPP TSG-RAN WG1 Meeting #96b Apr. 8-12, 2019 Xi'an, China.

(Continued)

*Primary Examiner* — Shukri Taha
(74) *Attorney, Agent, or Firm* — ScienBiziP, P.C.

(57) ABSTRACT

A wireless communication method and apparatus for handling radio resource collision are provided. The wireless communication method includes receiving a Radio Resource Control (RRC) configuration indicating a first Control Resource Set (CORESET) pool index associated with a Physical Uplink Control Channel (PUCCH) designated to carry Uplink Control Information (UCI); determining whether the PUCCH overlaps one or more Physical Uplink Shared Channels (PUSCHs) in time domain; after determining that the PUCCH overlaps at least one of the one or more PUSCHs in the time domain, multiplexing the UCI on a particular PUSCH of the one or more PUSCHs that is associated with the first CORESET pool index; and transmitting the UCI via the particular PUSCH.

20 Claims, 17 Drawing Sheets

(56)          References Cited

U.S. PATENT DOCUMENTS

| | | | |
|---|---|---|---|
| 2019/0349917 A1* | 11/2019 | Huang | .................. H04L 5/0053 |
| 2020/0014517 A1 | 1/2020 | Takeda et al. | |
| 2020/0053761 A1 | 2/2020 | Hosseini et al. | |
| 2021/0068195 A1* | 3/2021 | Yang | ................. H04W 72/0453 |
| 2022/0158775 A1* | 5/2022 | Xiong | .................. H04L 1/1864 |
| 2022/0408429 A1* | 12/2022 | Choi | .................... H04L 1/1812 |
| 2023/0137292 A1* | 5/2023 | Zhang | .................. H04L 5/0035 |
| | | | 370/329 |

OTHER PUBLICATIONS

3GPP TS 38.211 V16.5.0 (Mar. 2021), 3rd Generation Partnership Project; Technical Specification Group Radio Access Network; NR; Physical channels and modulation (Release 16).
3GPP TS 38.214 V16.5.0 (Mar. 2021), 3rd Generation Partnership Project; Technical Specification Group Radio Access Network; NR; Physical layer procedures for data (Release 16).

\* cited by examiner 502          504 sub-slot#1          sub-slot#2 slot#1          slot#2

522          524

<u>1600</u>

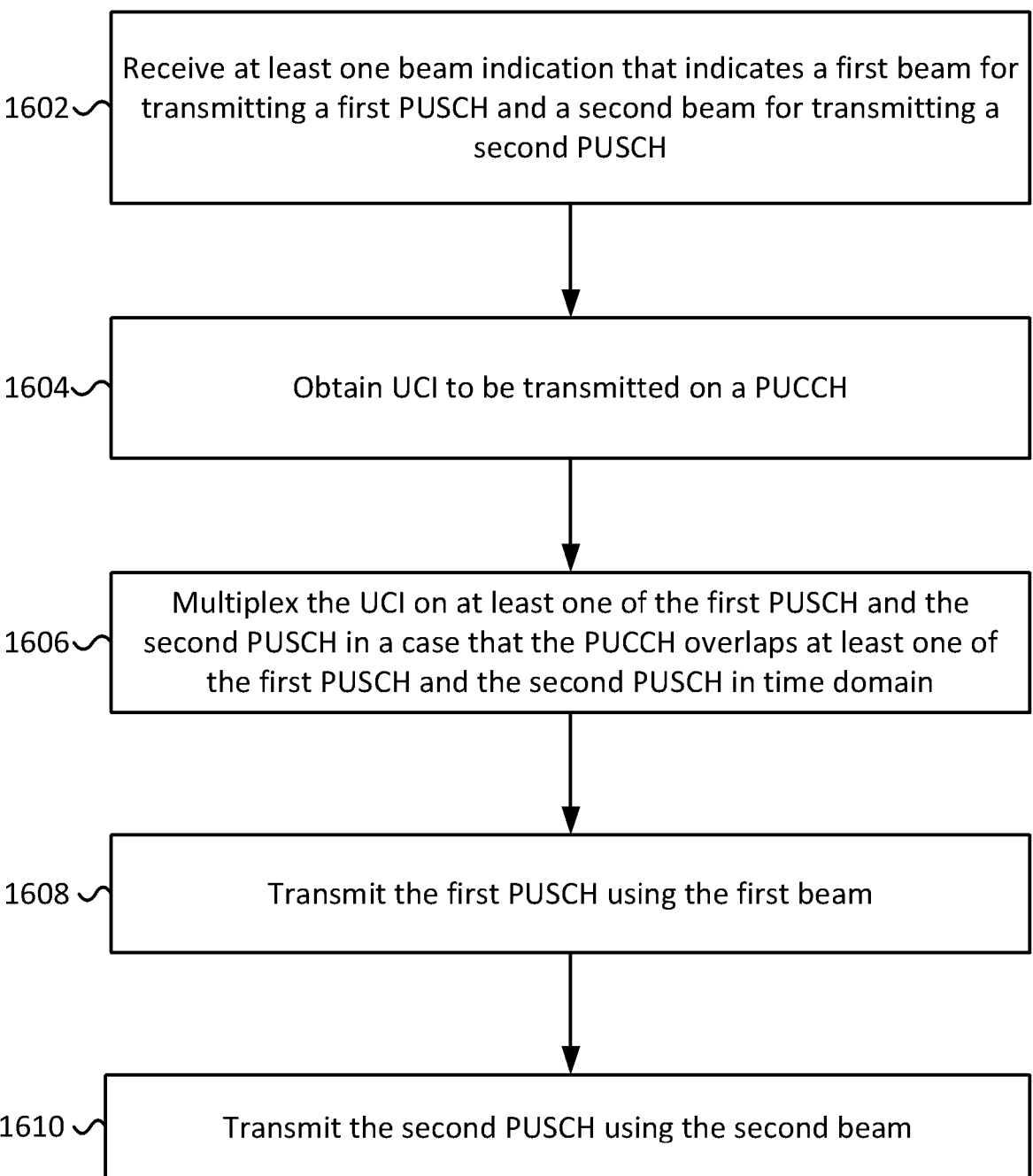

1602 — Receive at least one beam indication that indicates a first beam for transmitting a first PUSCH and a second beam for transmitting a second PUSCH 1604 — Obtain UCI to be transmitted on a PUCCH 1606 — Multiplex the UCI on at least one of the first PUSCH and the second PUSCH in a case that the PUCCH overlaps at least one of the first PUSCH and the second PUSCH in time domain 1608 — Transmit the first PUSCH using the first beam 1610 — Transmit the second PUSCH using the second beam

Figure 16

METHOD AND USER EQUIPMENT FOR HANDLING RADIO RESOURCE COLLISION

CROSS-REFERENCE TO RELATED APPLICATION(S)

The present application is a National Stage Application of International Patent Application Serial No. PCT/CN2022/084467, filed on Mar. 31, 2022, which claims the benefit of and priority to U.S. Provisional Patent Application Ser. No. 63/169,825, filed on Apr. 1, 2021, the contents of all of which are hereby incorporated herein fully by reference for all purposes.

FIELD

The present disclosure generally relates to wireless communication and, more particularly, to a method and a user equipment (UE) for management of handling radio resource collision.

BACKGROUND

With the tremendous growth in the number of connected devices and the rapid increase in user/network traffic volume, various efforts have been made to improve different aspects of wireless communication for next-generation wireless communication systems, such as fifth-generation (5G) New Radio (NR) system, by improving data rate, latency, reliability, and mobility.

The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communications in the next-generation wireless communication systems.

SUMMARY

The present disclosure is directed to methods and apparatuses of handling radio resource collision.

According to a first aspect of the present disclosure, a wireless communication method performed by a UE for handling radio resource collision is provided. The wireless communication method includes receiving at least one beam indication that indicates a first beam for transmitting a first Physical Uplink Shared Channel (PUSCH) and a second beam for transmitting a second PUSCH; obtaining Uplink Control Information (UCI) to be transmitted on a Physical Uplink Control Channel (PUCCH); multiplexing the UCI on at least one of the first PUSCH and the second PUSCH in a case that the PUCCH overlaps at least one of the first PUSCH and the second PUSCH in the time domain; transmitting the first PUSCH using the first beam; and transmitting the second PUSCH using the second beam.

In some implementations of the first aspect of the present disclosure, the wireless communication method further includes forgoing transmitting the PUCCH in a case that the PUCCH overlaps at least one of the first PUSCH and the second PUSCH in the time domain.

In some implementations of the first aspect of the present disclosure, the UE is configured to communicate with a set of Transmission Reception Points (TRPs) including a first TRP and a second TRP, and the wireless communication method further includes communicating with the first TRP using the first beam and communicating with the second TRP using the second beam.

In some implementations of the first aspect of the present disclosure, the PUCCH is scheduled for a dynamic PUCCH transmission.

In some implementations of the first aspect of the present disclosure, the PUCCH is configured for a transmission of a PUCCH repetition.

In some implementations of the first aspect of the present disclosure, at least one of the first PUSCH and the second PUSCH is scheduled for a dynamic PUSCH transmission.

In some implementations of the first aspect of the present disclosure, at least one of the first PUSCH and the second PUSCH is scheduled for a transmission of a PUSCH repetition.

In some implementations of the first aspect of the present disclosure, the wireless communication method further includes sequentially transmitting the first beam and the second beam in a beam sweeping cycle of transmitting a set of beams including the first beam and the second beam.

In some implementations of the first aspect of the present disclosure, the wireless communication method further includes transmitting the first beam and the second beam according to a predetermined cyclic order in a beam sweeping cycle of transmitting a set of beams including the first beam and the second beam.

In some implementations of the first aspect of the present disclosure, the first PUSCH and the second PUSCH are transmitted in a same time slot.

In some implementations of the first aspect of the present disclosure, the first PUSCH and the second PUSCH are transmitted in different time slots.

According to a second aspect of the present disclosure, a UE for handling radio resource collision is provided. The UE includes a memory storing at least one computer-executable instruction and at least one processor coupled to the memory. The at least one processor is configured to execute the at least one computer-executable instruction to: receive at least one beam indication that indicates a first beam for transmitting a first PUSCH and a second beam for transmitting a second PUSCH; obtain UCI to be transmitted on a PUCCH; multiplex the UCI on at least one of the first PUSCH and the second PUSCH in a case that the PUCCH overlaps at least one of the first PUSCH and the second PUSCH in a time domain; transmit the first PUSCH using the first beam; and transmit the second PUSCH using the second beam.

In some implementations of the second aspect of the present disclosure, the at least one processor is further configured to execute the at least one computer-executable instruction to forgo transmitting the PUCCH in a case that the PUCCH overlaps at least one of the first PUSCH and the second PUSCH in the time domain.

In some implementations of the second aspect of the present disclosure, the UE is configured to communicate with a set of Transmission Reception Points (TRPs) including a first TRP and a second TRP, and the at least one processor is further configured to execute the at least one computer-executable instruction to: communicate with the first TRP using the first beam and communicate with the second TRP using the second beam.

In some implementations of the second aspect of the present disclosure, the PUCCH is scheduled for a dynamic PUCCH transmission.

In some implementations of the second aspect of the present disclosure, the PUCCH is configured for a transmission of a PUCCH repetition.

In some implementations of the second aspect of the present disclosure, at least one of the first PUSCH and the second PUSCH is scheduled for a dynamic PUSCH transmission.

In some implementations of the second aspect of the present disclosure, at least one of the first PUSCH and the second PUSCH is scheduled for a transmission of a PUSCH repetition.

In some implementations of the second aspect of the present disclosure, the at least one processor is further configured to execute the at least one computer-executable instruction to sequentially transmit the first beam and the second beam in a beam sweeping cycle of transmitting a set of beams including the first beam and the second beam.

In some implementations of the second aspect of the present disclosure, the at least one processor is further configured to execute the at least one computer-executable instruction to: transmit the first beam and the second beam according to a predetermined cyclic order in a beam sweeping cycle of transmitting a set of beams including the first beam and the second beam.

In some implementations of the second aspect of the present disclosure, the first PUSCH and the second PUSCH are transmitted in a same time slot.

In some implementations of the second aspect of the present disclosure, the first PUSCH and the second PUSCH are transmitted in different time slots.

According to a third aspect of the present disclosure, a wireless communication method performed by a User Equipment (UE) for handling radio resource collision is provided. The wireless communication method includes receiving a Radio Resource Control (RRC) configuration indicating a first Control Resource Set (CORESET) pool index associated with a Physical Uplink Control Channel (PUCCH) designated to carry Uplink Control Information (UCI); determining whether the PUCCH overlaps one or more Physical Uplink Shared Channels (PUSCHs) in time domain; after determining that the PUCCH overlaps at least one of the one or more PUSCHs in the time domain, multiplexing the UCI on a particular PUSCH of the one or more PUSCHs that is associated with the first CORESET pool index; and transmitting the UCI via the particular PUSCH.

In some implementations of the third aspect of the present disclosure, the wireless communication method further includes dropping a transmission of the PUCCH after determining that the PUCCH overlaps the at least one of the one or more PUSCHs in the time domain.

In some implementations of the third aspect of the present disclosure, the RRC configuration further indicates a second CORESET pool index, the first CORESET pool index is associated with a first Transmission Reception Point (TRP), and the second CORESET pool index is associated with a second TRP.

In some implementations of the third aspect of the present disclosure, the PUCCH is scheduled for a dynamic PUCCH transmission.

In some implementations of the third aspect of the present disclosure, the PUCCH is scheduled for a transmission of a PUCCH repetition.

In some implementations of the third aspect of the present disclosure, each PUSCH of the one or more PUSCHs is scheduled by a respective PDCCH.

In some implementations of the third aspect of the present disclosure, the particular PUSCH is scheduled for a transmission of a PUSCH repetition.

In some implementations of the third aspect of the present disclosure, the wireless communication method further includes transmitting the one or more PUSCHs according to a predetermined sequential order in a beam sweeping cycle after determining that the PUCCH overlaps at least one of the one or more PUSCHs in the time domain, where each PUSCH of the one or more PUSCHs is associated with a respective beam.

In some implementations of the third aspect of the present disclosure, the wireless communication method further includes transmitting the one or more PUSCHs according to a predetermined cyclic order in a beam sweeping cycle after determining that the PUCCH overlaps at least one of the one or more PUSCHs in the time domain, where each PUSCH of the one or more PUSCHs is associated with a respective beam.

In some implementations of the third aspect of the present disclosure, the UCI includes Hybrid Automatic Repeat Request (HARQ)-Acknowledgment (ACK) information.

According to a fourth aspect of the present disclosure, a User Equipment (UE) for handling radio resource collision is provided. The UE includes at least one processor and at least one memory coupled to the at least one processor. The at least one memory stores one or more computer-executable instructions that, when executed by the at least one processor, cause the UE to receive a Radio Resource Control (RRC) configuration indicating a first Control Resource Set (CORESET) pool index associated with a Physical Uplink Control Channel (PUCCH) designated to carry Uplink Control Information (UCI); determine whether the PUCCH overlaps one or more Physical Uplink Shared Channels (PUSCHs) in time domain; after determining that the PUCCH overlaps at least one of the one or more PUSCHs in the time domain, multiplex the UCI on a particular PUSCH of the one or more PUSCHs that is associated with the first CORESET pool index; and transmit the UCI via the particular PUSCH.

In some implementations of the fourth aspect of the present disclosure, the one or more computer-executable instructions, when executed by the at least one processor, further cause the UE to drop a transmission of the PUCCH after determining that the PUCCH overlaps the at least one of the one or more PUSCHs in the time domain.

In some implementations of the fourth aspect of the present disclosure, the RRC configuration further indicates a second CORESET pool index, the first CORESET pool index is associated with a first Transmission Reception Point (TRP), and the second CORESET pool index is associated with a second TRP.

In some implementations of the fourth aspect of the present disclosure, the PUCCH is scheduled for a dynamic PUCCH transmission.

In some implementations of the fourth aspect of the present disclosure, the PUCCH is scheduled for a transmission of a PUCCH repetition.

In some implementations of the fourth aspect of the present disclosure, each PUSCH of the one or more PUSCHs is scheduled by a respective PDCCH.

In some implementations of the fourth aspect of the present disclosure, the particular PUSCH is scheduled for a transmission of a PUSCH repetition.

In some implementations of the fourth aspect of the present disclosure, the one or more computer-executable instructions, when executed by the at least one processor, further cause the UE to transmit the one or more PUSCHs according to a predetermined sequential order in a beam sweeping cycle after determining that the PUCCH overlaps at least one of the one or more PUSCHs in the time domain, where each PUSCH of the one or more PUSCHs is associated with a respective beam.

In some implementations of the fourth aspect of the present disclosure, the one or more computer-executable instructions, when executed by the at least one processor, further cause the UE to transmit the one or more PUSCHs according to a predetermined cyclic order in a beam sweeping cycle after determining that the PUCCH overlaps at least one of the one or more PUSCHs in the time domain, where each PUSCH of the one or more PUSCHs is associated with a respective beam.

In some implementations of the fourth aspect of the present disclosure, the UCI includes Hybrid Automatic Repeat Request (HARQ)-Acknowledgment (ACK) information.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

FIG. 16 is a flowchart of a wireless communication method performed by a UE for handling radio resource collision, according to an example implementation of the present disclosure.

DETAILED DESCRIPTION

Figure 1:
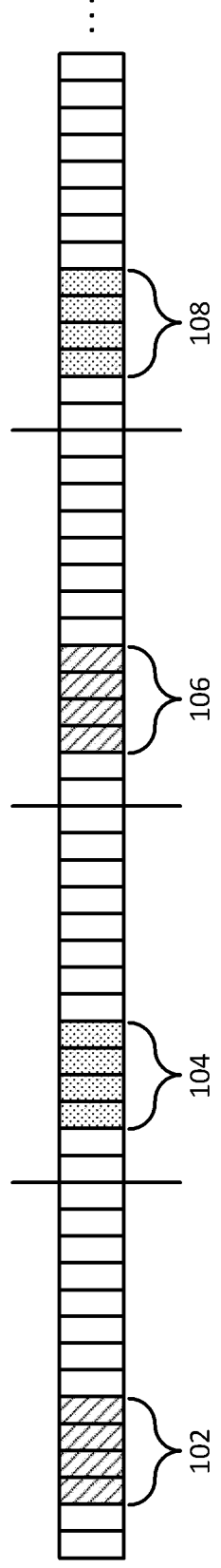
FIG. 1 is a diagram that illustrates UL transmissions performed based on a PUSCH repetition Type A in a multi-TRP scenario, according to an example implementation of the present disclosure.

Some of the acronyms in the present application are defined as follows and unless otherwise specified, the acronyms have the following meanings:

Acronym Full Name
3GPP 3d Generation Partnership Project
5G 5th generation
ACK Acknowledgment
BWP Band Width Part
CA Carrier Aggregation
CORESET Control resource set
CC Component Carrier
CCE Control Chanel Element
CRC Cyclic Redundancy Check
C-RNTI Cell Radio Network Temporary Identifier
CS-RNTI Configured Scheduling Radio Network Temporary Identifier
CSS Common Search Space
CSI Channel State Information
DC Dual Connectivity
DCI Downlink Control Information
DL Downlink
FR1 Frequency Range 1
FR2 Frequency Range 2
GC-PDCCH Group Common Physical Downlink Control Channel
HARQ Hybrid Automatic Repeat Request
IE Information Element
IIoT Industrial Internet of Things
LRR Link Recovery Request
LSB Least Significant Bit
LTE Long Term Evolution
L1 Layer 1
MAC Medium Access Control
MCG Master Cell Group
MCS-C-RNTI Modulation Coding Scheme Cell Radio Network Temporary Identifier
MU-MIMO Multi-User Multi-input Multi-output
MIMO Multi-input Multi-output
MSB Most Significant Bit
NACK Negative Acknowledgment
NDI New Data Indicator
NR New Radio
NW Network
PCell Primary Cell PSCell Primary Secondary Cell
PBCH Physical Broadcast Channel
PDCCH Physical Downlink Control Channel
PDSCH Physical Downlink Shared Channel
PDU Protocol Data Unit
PHY Physical
PRACH Physical Random Access Channel
PTAG Primary Timing Advance Group
PUCCH Physical Uplink Control Channel
PUSCH Physical Uplink Shared Channel
RA Random Access
RAN Radio Access Network
Rel Release
RMSI Remaining Minimum System Information
RNTI Radio Network Temporary Identifier
RRC Radio Resource Control
RSRP Reference Signal Received Power
RV Redundancy Version
SCell Secondary Cell
SCG Secondary Cell Group
SCS Subcarrier Spacing
SINR Signal to Interference plus Noise Ratio
SpCell Special Cell
SR Scheduling Request
SRS Sounding Reference Signal
SRI SRS Resource Indicator
SSB Synchronization Signal Block
STAG Secondary Timing Advance Group
TA Timing Advance
TAG Timing Advance Group
TB Transport Block
TBS Transport Block Size
TCI Transmission Configuration Indication
TR Technical Report
TRP Transmission/Receiving Points
TS Technical Specification
QCL Quasi-CoLocation
UE User Equipment
UL Uplink
URLLC Ultra Reliable Low Latency Communication
USS UE-Specific Search Space
WG Working Group
WI Working Item The following contains specific information related to the implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, features may be identified (although, in some examples, not illustrated) by the same numerals in the drawings. However, the features in different implementations may differ in other respects and shall not be narrowly confined to what is illustrated in the drawings.

The phrases "in some implementations" or "in one example" may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist. For example, A and/or B may represent that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Application-Specific Integrated Circuits (ASICs), programmable logic arrays, and/or one or more Digital Signal Processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using multiple cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the several cells.

A cell may allocate Sidelink (SL) resources for supporting Proximity Service (ProSe), LTE SL services, LTE/NR sidelink communication services, LTE/NR sidelink discovery services, and/or LTE/NR Vehicle-to-Everything (V2X) services.

Examples of some selected terms used in the present disclosure are provided as follows.

Antenna Panel: a conceptual term for UE antenna implementation. It may be assumed that a panel is an operational unit for controlling a transmit spatial filter (beam). A panel is typically consisted of multiple antenna elements. In one implementation, a beam may be formed by a panel. To form two beams simultaneously, two panels are needed. Such simultaneous beamforming from multiple panels is subject to the UE capability. A similar definition for "panel" may be possible by applying spatial receiving filtering characteristics.

TCI state: a TCI state contains parameters for configuring a QCL relationship between one or two reference signals and a target reference signal set. For example, a target reference signal set may be the DM-RS ports of PDSCH, PDCCH, PUCCH or PUSCH. The one or two reference signals may be UL or DL reference signals. In NR Rel-15/16, the TCI state is used for DL QCL indication whereas the spatial relation information is used for providing UL spatial transmission filter information for UL signal(s) or UL channel(s). Here, a TCI state may refer to the information provided similar to the spatial relation information, which may be used for an UL transmission. In other words, from the UL perspective, a TCI state provides UL beam information which may provide the information for a relationship between the UL transmission and DL or UL reference signals (e.g., CSI-RS, SSB, SRS, PTRS).

Panel: UE panel information may be derived from the TCI state/UL beam indication information or network signaling.

Beam: The term "beam" may be replaced by a spatial filter. For example, when a UE reports a preferred gNB TX beam, the UE is essentially selecting a spatial filter used by the gNB. The term "beam information" is used to provide information about which beam/spatial filter is being used/selected.

NR supports downlink transmission of the same NR-PDSCH data stream(s) from multiple TRPs with at least ideal backhaul, and different NR-PDSCH data streams from multiple TRPs with the ideal backhaul and the non-ideal backhaul. The idea backhaul enables a single PDCCH from one TRP scheduling data transmission by multiple TRPs (e.g., single-PDCCH based multi-TRP/panel PUCCH/PUSCH transmission) while the non-idea backhaul may require multiple PDCCHs with each TRP having one PDCCH for scheduling the corresponding data transmission (e.g., a multi-PDCCH based multi-TRP/panel PUCCH/PUSCH transmission).

In 3GPP NR specification release 15 (Rel-15), a scalable and very flexible MIMO framework is introduced, for example, to support a beam management operation and a flexible CSI acquisition. In NR Rel-16 work item, to achieve increased robustness, lower overhead, and lower latency, and enhancements on MU-MIMO support, multi-TRP/panel transmission including improved reliability and robustness for the idea backhaul and non-idea backhaul is provided. The Multi-beam operation which primarily targets an FR2 operation is also implemented in the NR Rel-16 work item.

In NR Rel-16 URLLC, more than one HARQ-ACK codebook for different service types may be simultaneously generated in a slot, and thus a sub-slot-based PUCCH transmission is introduced to achieve lower latency requirements. The number of symbols in a sub-slot is configured by the RRC signaling, and thus a slot may include more than onesub-slot.

Slot-based PUSCH repetition, which is also referred to as a PUSCH repetition Type A, is applied if a UE does not apply non-slot-based PUSCH repetition, which is also referred to as a PUSCH repetition Type B, when determining the time domain resource allocation. The number of repetitions for the PUSCH repetition Type A may be determined by a parameter named numberOfRepetitions (if present) in a resource allocation table or determined by a parameter named pusch-AggregationFactor (if configured and numberOfRepetitions is not present), otherwise, the number of repetitions may be equal to 1.

For the PUSCH repetition Type A, a PUSCH mapping type may be set to Type A or Type B. Furthermore, for a PUSCH repetition Type A, in a case that the number of repetitions is larger than 1, the same symbol allocation may be applied across the indicated number of consecutive slots, as illustrated in FIG. 1.

FIG. 1 is a diagram that illustrates UL transmissions performed based on a PUSCH repetition Type A in a multi-TRP scenario, according to an example implementation of the present disclosure. Each rectangle in the diagram may represent a symbol. Each slot defined in 5G NR may consist of 14 symbols. Consequently, there are 4 slots shown in FIG. 1.

As illustrated in FIG. 1, different beams (not shown in the figure), such as beam #1 and beam #2, may be applied to transmit different PUSCH repetitions (e.g., PUSCH repetition #1 102, PUSCH repetition #2 104, PUSCH repetition #3 106 and PUSCH repetition #4 108) towards the corresponding TRPs. For example, beam #1 may be used to transmit PUSCH repetition #1 102 and PUSCH repetition #3 106 towards TRP #1, and beam #2 may be used to transmit PUSCH repetition #2 104 and PUSCH repetition #4 108 towards TRP #2.

In NR Rel-16 URLLC WI, to achieve lower latency requirements for a PUSCH transmission, a non-slot-based PUSCH repetition is supported. The UE applies a PUSCH repetition Type B procedure when the RRC parameter is set to 'pusch-RepTypeB', and the number of repetitions is referred to as a nominal repetition. The number of nominal repetitions is given by numberofrepetitions. If the number of potentially valid symbols for a PUSCH repetition Type B transmission is greater than zero for a nominal repetition, the nominal repetition consists of one or more actual repetitions, where each actual repetition consists of a consecutive set of all potentially valid symbols that may be used for the PUSCH repetition Type B transmission within a slot. For a PUSCH repetition Type B, the PUSCH mapping type is set to Type B.

Figure 2:
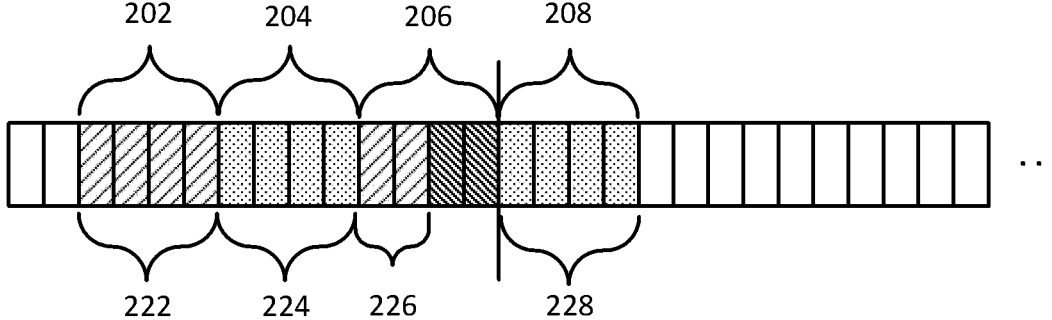
FIG. 2 is a diagram that illustrates UL transmissions performed based on a PUSCH repetition Type B, according to an example implementation of the present disclosure.

FIG. 2 is a diagram that illustrates UL transmissions performed based on a PUSCH repetition Type B, according to an example implementation of the present disclosure. Each rectangle in the diagram may represent a symbol.

In FIG. 2, different beams may be cyclically or sequentially mapped to each nominal repetition (e.g., nominal repetitions 202, 204, 206, and 208) or each actual repetition (e.g., actual repetitions 222, 224, 226, and 228). It is noted that a "nominal repetition" is the repetition for which the UE receives a UL grant, whereas an "actual repetition" is a segment of a nominal repetition that is actually transmitted by the UE. For example, for a nominal repetition spanning across a slot boundary, the nominal repetition may be split into two actual repetitions by the slot boundary from the UE's perspective. For example, for a nominal repetition spanning across an invalid symbol(s) for transmission (e.g., a DL symbol, if the nominal repetition is a UL repetition, such as a PUSCH repetition), the nominal repetition may also be split into two actual repetitions by the invalid symbol from the UE's perspective. As illustrated in FIG. 2, the nominal repetition 206 spans over two invalid symbols (e.g., the last two symbols in the first slot). Consequently, the actual repetition 226 only spans over the first two symbols of the nominal repetition 206.

A nominal/actual repetition may refer to a nominal/actual PUSCH repetition. In the present disclosure, a repetition may refer to either a "nominal repetition" or an "actual repetition," unless otherwise stated. Moreover, a repetition may be a UL-based repetition or a DL-based repetition. For example, a repetition may be a PUSCH repetition. In the present disclosure, a repetition may refer to a transmission occasion for a nominal repetition or an actual repetition.

Furthermore, in the present disclosure, "cyclical mapping" may mean that multiple beams are transmitted according to a predetermined cyclic order in a beam sweeping cycle, or may refer to a TCI state mapping order for which, if a repetition has applied a certain TCI state, the next repetition in the same beam sweeping cycle applies another TCI state. For example, if only beam #1 and beam #2 are transmitted in a beam sweeping cycle, the UE may transmit beam #1 and beam #2 in alternating order of [beam #1, beam #2, beam #1, beam #2, etc.] if cyclical mapping is applied. Given this, in FIG. 2, beam #1 may be applied to transmit the first and third nominal repetitions 202 and 206, and beam #2 may be applied to transmit the second and fourth nominal repetitions 204 and 208 when cyclical mapping is applied.

On the other hand, in the present disclosure, "sequential mapping" may mean that multiple beams are sequentially transmitted in a beam sweeping cycle, or may refer to a TCI state mapping order for which a certain set of sequential repetitions may apply the same TCI state, the next set of sequential repetitions may apply another TCI state, and so on. In other words, for sequential mapping, a certain number of sequential repetitions may apply the same TCI state. For example, if only beam #1 and beam #2 are transmitted in a beam sweeping cycle, the UE may transmit beam #1 and beam #2 in sequential order of [beam #1, beam #1, beam #2, beam #2, . . . ] if sequential mapping is applied, where the number of sequential repetitions applying the same TCI state/beam is set to "2" in this example. Given this, in FIG. 2, beam #1 may be applied to transmit the first and second nominal repetitions 202 and 204, and beam #2 may be applied to transmit the third and fourth nominal repetitions 206 and 208 if sequential mapping is applied.

In NR Rel-16 specification, if a UE is configured with a number of repetitions for a PUCCH transmission, the UE may repeat the PUCCH transmission with the UCI over a number of slots, where each repetitive PUCCH transmission may have the same number of consecutive symbols, the same first symbol, and/or the same UCI type.

If a UE is concurred with overlapping resources for PUCCH and PUSCH transmissions in a slot, the UE may multiplex the UCI on a PUSCH when certain multiplexing conditions are met. The multiplexing conditions may include at least one of a priority checking, timeline conditions, and a UCI types checking, where priority checking is to ensure that the multiplexing procedure happens between resources with the same priority, timeline conditions are to ensure that the UE has enough time to process the overlapping resources, and the UCI types checking is to ensure that some specific UCI types may not be multiplexed in the PUSCH. For example, the SR may not be multiplexed in the PUSCH. After the multiplexing procedure, the UE does not expect to transmit any PUSCH which overlaps a PUCCH in a slot in the time domain.

In NR Rel-17, the concept of beam management for UL channel is introduced (e.g., TCI for UL), and thus multiple-TRP deployment may also be applied to the UL channels (e.g., PUCCH and PUSCH). For multi-TRP deployment, different transmissions may correspond to different beams towards different TRPs. As such, how to transmit multiple overlapping channels with different beams may become an issue.

For example, one PUCCH may overlap one PUSCH in the time domain. Given this, each of the PUCCH and PUSCH may be transmitted using different beams.

For example, more than one PUCCH may overlap one PUSCH. Given this, the PUCCHs and the PUSCH may be transmitted using the same or different beams.

For example, more than one PUCCH may overlap each other. Given this, the PUCCHs may be transmitted using the same or different beams.

For example, one PUCCH may overlap more than one PUSCH. Given this, the PUCCH and the PUSCHs may be transmitted using the same or different beams.

For example, more than one PUCCH may overlap more than one PUSCHs. Given this, the PUCCHs and the PUSCHs may be transmitted using the same or different beams.

In the present disclosure, a PUCCH may be used to transmit the UCI including HARQ-ACK information, SR, and/or CSI reports. Furthermore, the PUCCH may refer to a configured PUCCH transmission, a dynamic scheduled PUCCH resource transmission, a slot-based PUCCH repetition transmission, or a non-slot-based PUCCH repetition transmission (e.g., a sub-slot-based PUCCH repetition). For example, the PUSCH may be a dynamic scheduled PUSCH, a Type 1 CG PUSCH, a Type 2 CG PUSCH, a PUSCH repetition Type A, or a PUSCH repetition Type B. Specifically, the dynamic scheduled PUCCH and dynamic scheduled PUSCH may refer to a transmission indicated by the DCI.

In some implementations, channels/resources corresponding to the same beam may refer to those channels/resources corresponding to the same SRI, TPMI, TCI state, power setting, CORESETPoolIndex, and/or spatial relation information for PUCCH and/or for PUSCH. In some cases, there may be no explicit indication on the beam information and a default beam which is determined based on a (pre-)configured/(pre-)determined rule may be applied. The default beam may be used to transmit different channels/resources.

In some implementations, channels/resources corresponding to the same beam may refer to those channels/resources that use the same spatial domain filter/setting to receive an SS/PBCH block.

In some implementations, channels/resources corresponding to the same beam may refer to those channels/resources that use the same spatial domain filter/setting to receive a periodic/semi-persistent/aperiodic CSI-RS resource.

In some implementations, channels/resources corresponding to the same beam may refer to those channels/resources that apply the same spatial domain filter/setting for transmissions towards the corresponding TRP.

In some implementations, channels/resources corresponding to the same beam may refer to those channels/resources using the same spatial domain filter/setting for transmissions of an SRS. The SRS resource may be used for at least one of the following purposes: beam management, codebook-based channel sounding, and non-codebook-based channel sounding.

In some implementations, channels/resources corresponding to the same beam may refer to those channels/resources that use the same spatial domain filter/setting for PDCCH receptions corresponding to the same CORESET ID.

In some implementations, channels/resources corresponding to the same beam may refer to those channels/resources that use the same spatial domain filter/setting for receiving PDCCH(s) of which the associated CORESET index(es) corresponds to the same CORESET pool index.

In some implementations, channels/resources corresponding to the same beam may refer to those channels/resources that are indicated to the same set of power control parameters. For example, the power control parameters may refer to parameters for pathloss RS, TPC command, and so on.

In some implementations, overlapping resources/channels may mean that at least two resources/channels are partially or fully overlapped with each other in the time domain and/or in the frequency domain. For example, one resource/channel may be considered partially overlapping with another one if the resource elements of this resource/channel do not fully align or overlap the resource elements of another one. By contrast, one resource/channel may be considered fully overlapping with another one if the resource elements of this resource/channel fully align or overlap the resource elements of another one. Specifically, overlapping may refer to the more than one resource partially or fully overlapping in the time domain and/or the frequency domain.

In some implementations, a UE may only expect to handle the overlapping PUCCHs corresponding to the same beam in a slot/sub-slot.

In some implementations, a UE may only expect to handle the overlapping PUCCHs and PUSCHs corresponding to the same beam in a slot/sub-slot.

In some implementations, a UE may determine whether to handle the overlapping UL resources corresponding to different beams according to the received indication. For example, the indication may refer to a specific parameter (e.g., from the RRC layer), a specific configuration (e.g., from the RRC layer), and/or a specific MAC CE. For example, the parameter may correspond to an 'enable' flag or a bit with a value of 0/1. For example, the configuration may correspond to a PUCCH configuration (e.g., a PUCCH-Config), a PUSCH configuration (e.g., a PUSCH-Config), or a configuration for a multi-TRP scheme. For example, the indication may refer to a specific DCI format, a specific DCI field, and/or a DCI format with the CRC scrambled by a specific RNTI.

In some implementations, a UE may determine whether to handle the overlapping UL resources corresponding to different beams according to UE capability.

In some implementations, a UE may only determine whether to handle the overlapping UL resources corresponding to different beams in FR2.

In some implementations, a UE may expect a PUCCH that is in response to a DCI format detection to overlap any other PUCCH and/or PUSCH corresponding to beams that are different from the beam used to transmit the PUCCH that does not satisfy the defined timing conditions.

In some implementations, a UE may determine whether to handle the overlapping UL resources corresponding to different beams applying the different panels.

In some implementations, a UE may determine whether to handle the overlapping UL resources corresponding to different pieces of spatial relation information.

In some implementations, the UCI multiplexing (on PUSCH) issue may be addressed by assuming that the PUCCH resource used for the UCI transmission overlaps a PUSCH resource. The PUCCH resource may be configured/indicated to be transmitted using a first beam (e.g., beam #1) and the PUSCH resource may be configured/indicated to be transmitted using a second beam (e.g., beam #2), where the first and second beams may or may not be the same. In some implementations, the PUCCH transmission may be a PUCCH repetition for transmitting the UCI. In some implementations, the PUSCH transmission may be a PUSCH repetition for transmitting the same transport block. In some implementations, the PUCCH transmission may be a one-shot PUCCH transmission that is scheduled by the DCI. In some implementations, the PUSCH transmission may be a configured PUCCH transmission. In some implementations, the PUSCH transmission may be a dynamic scheduled PUSCH transmission. In some implementations, the PUSCH transmission may be a configured PUSCH transmission.

Figure 3:
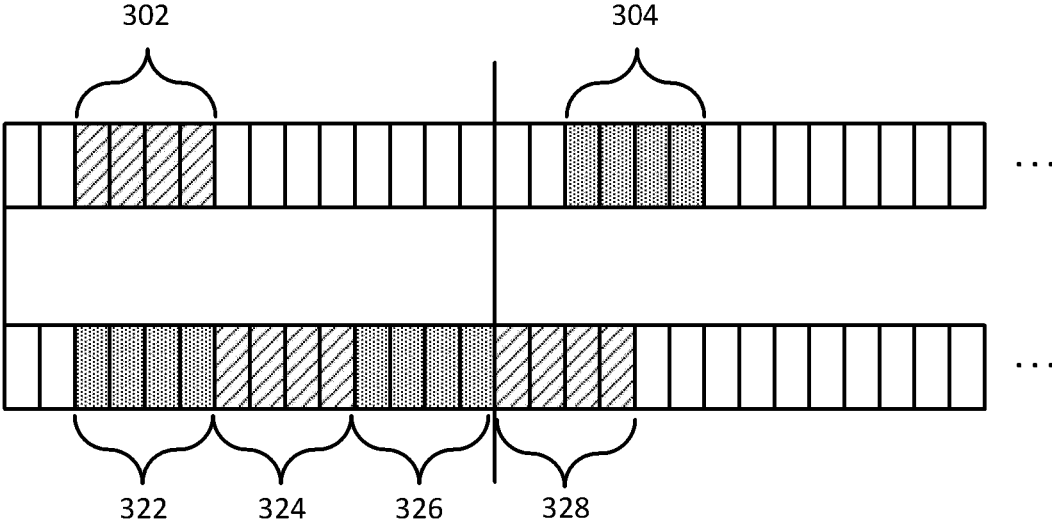
FIG. 3 is a diagram illustrating that PUCCH repetitions overlap PUSCH repetitions, according to an example implementation of the present disclosure.

FIG. 3 is a diagram illustrating that PUCCH repetitions overlap PUSCH repetitions, according to an example implementation of the present disclosure. Each rectangle in the diagram may represent a symbol. In FIG. 3, there are two slot-based PUCCH repetitions (e.g., PUCCH repetition #1 302 and PUCCH repetition #2 304) that overlap at least part of a set of non-slot-based PUSCH repetitions (e.g., PUSCH repetition #1 322, PUSCH repetition #2 324, PUSCH repetition #3 326, and PUSCH repetition #4 328) in the time domain. PUCCH repetition #1 302 in the first slot may be transmitted using a first beam (e.g., beam #1). PUCCH repetition #2 304 in the second slot may be transmitted using a second beam (e.g., beam #2). PUSCH repetition #1 322 and PUSCH repetition #3 326 may be transmitted using the second beam (e.g., beam #2). PUSCH repetition #2 324 and the PUSCH repetition #4 328 may be transmitted using the first beam (e.g., beam #1). Furthermore, as illustrated in FIG. 3, PUCCH repetition #1 302 with beam #1 may fully overlap PUSCH repetition #1 322 with beam #2 in the time domain, and PUCCH repetition #2 304 with beam #2 may partially overlap PUSCH repetition #4 328 with beam #1 in the time domain.

In the present disclosure, the first beam (e.g., beam #1) and the second beam (e.g., beam #2) may refer to two beams transmitted towards at least one TRP. For example, in a multi-TRP scenario, channels using beam #1 may be transmitted towards TRP #1 and channels using beam #2 may be transmitted towards TRP #2, where TRP #1 and TRP #2 may be coupled to the same base station. In another example, beam #1 and beam #2 may be transmitted towards the same TRP.

Figure 4:
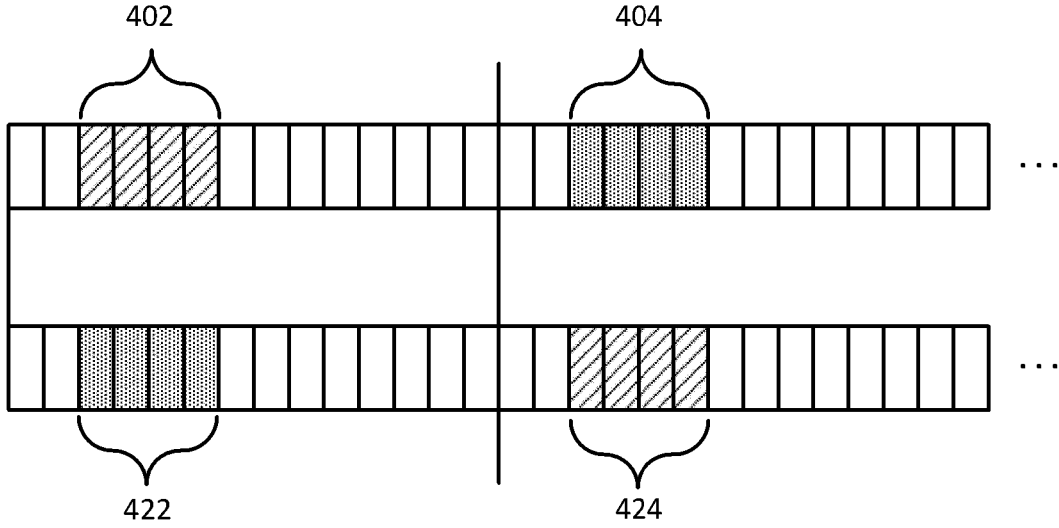
FIG. 4 is a diagram illustrating that PUCCH repetitions overlap PUSCH repetitions, according to an example implementation of the present disclosure.

FIG. 4 is a diagram illustrating that PUCCH repetitions overlap PUSCH repetitions, according to an example implementation of the present disclosure. Each rectangle in the diagram may represent a symbol. In FIG. 4, there are two slot-based PUCCH repetitions (e.g., PUCCH repetition #1 402 and PUCCH repetition #2 404) that overlap a set of slot-based PUSCH repetitions (e.g., PUSCH repetition #1 422 and PUSCH repetition #2 424) in the time domain. PUCCH repetition #1 402 in the first slot may be transmitted using a first beam (e.g., beam #1). PUCCH repetition #2 404 in the second slot may be transmitted using a second beam (e.g., beam #2). PUSCH repetition #1 422 may be transmitted using the second beam. PUSCH repetition #2 424 may be transmitted using the first beam. In the time domain, the slot-based PUCCH repetition #402 overlaps the slot-based PUSCH repetition #1 422 in the first slot, and the slot-based PUCCH repetition #2 404 overlaps the slot-based PUSCH repetition #2 424.

Figure 5:
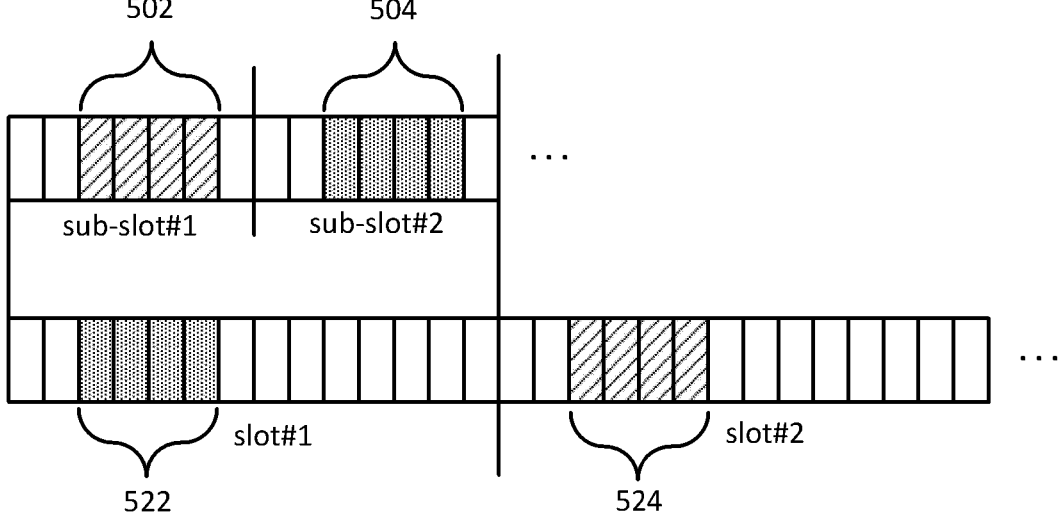
FIG. 5 is a diagram illustrating that at least one PUCCH repetition overlaps at least part of a set of PUSCH repetitions, according to an example implementation of the present disclosure.

FIG. 5 is a diagram illustrating that at least one PUCCH repetition overlaps at least part of a set of PUSCH repetitions, according to an example implementation of the present disclosure. Each rectangle in the diagram may represent a symbol. In FIG. 5, there are two non-slot-based PUCCH repetitions (e.g., PUCCH repetition #1 502 in sub-slot #1 of slot #1 and PUCCH repetition #2 504 in sub-slot #2 of slot #1). PUCCH repetition #1 502 overlaps one of a set of slot-based PUSCH repetitions (e.g., PUSCH repetition #1 522 in slot #1 and PUSCH repetition #2 524 in slot #2) in the time domain. For example, PUCCH repetition #1 502 may overlap PUSCH repetition #1 522 in slot #1. PUCCH repetition #1 502 may be transmitted using a first beam (e.g., beam #1). PUCCH repetition #2 504 may be transmitted using a second beam (e.g., beam #2). PUSCH repetition #1 522 may be transmitted using the second beam. PUSCH repetition #2 524 may be transmitted using the first beam.

Figure 6:
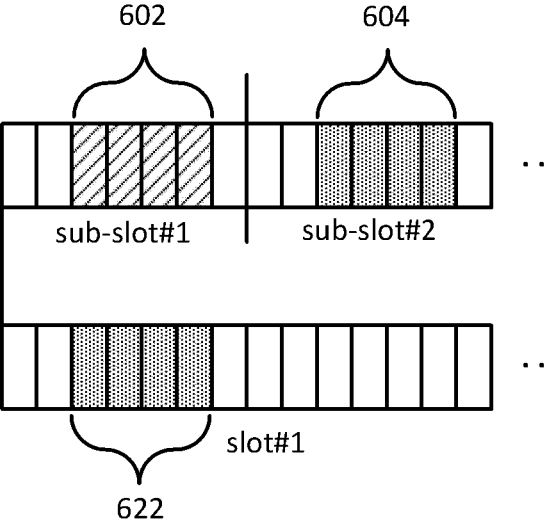
FIG. 6 is a diagram illustrating that at least one PUCCH repetition overlaps a dynamic PUSCH, according to an example implementation of the present disclosure.

FIG. 6 is a diagram illustrating that at least one PUCCH repetition overlaps a dynamic PUSCH, according to an example implementation of the present disclosure. Each rectangle in the diagram may represent a symbol.

In the present disclosure, a dynamic PUSCH may refer to a PUSCH that is scheduled for a dynamic PUSCH transmission. Compared with a PUSCH repetition that may be repeatedly transmitted multiple times by the UE, the dynamic PUSCH transmission may be considered a one-shot transmission that is dynamically triggered/scheduled by specific signaling from the network.

In FIG. 6, there are two non-slot-based PUCCH repetitions (e.g., PUCCH repetition #1 602 in sub-slot #1 of slot #1 and PUCCH repetition #2 604 in sub-slot #2 of slot #1), where the PUCCH repetition #1 602 overlaps a slot-based PUSCH repetition (e.g., dynamic PUSCH 622 in slot #1) in the time domain. PUCCH repetition #1 602 may be transmitted using a first beam (e.g., beam #1). PUCCH repetition #2 604 may be transmitted using a second beam (e.g., beam #2). dynamic PUSCH 622 may be transmitted using the second beam.

Figure 7:
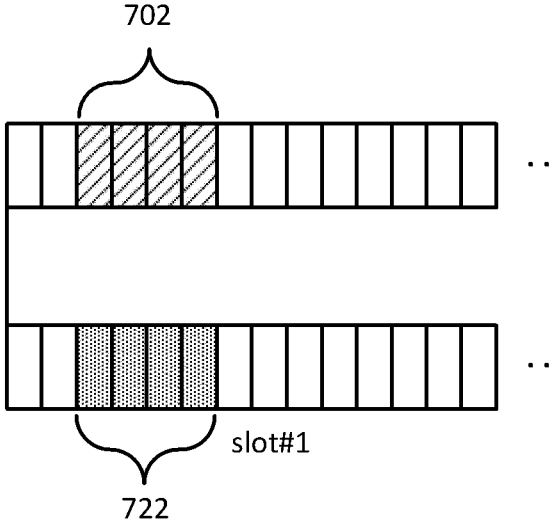
FIG. 7 is a diagram illustrating that a PUCCH overlaps a dynamic PUSCH, according to an example implementation of the present disclosure.

FIG. 7 is a diagram illustrating that a PUCCH overlaps a dynamic PUSCH, according to an example implementation of the present disclosure. Each rectangle in the diagram may represent a symbol. As illustrated in FIG. 7, a PUCCH 702 that includes HARQ-ACK information/SR information bit/LRR information bit/CSI bits may overlap a dynamic PUSCH 722 in the time domain, where the PUCCH 702 may be transmitted using beam #1 and the dynamic PUSCH 722 may be transmitted using beam #2.

In some implementations, a UE may not expect that the UCI is multiplexed on a PUSCH with different beams and/or different spatial relation information in a slot/sub-slot. In other words, the UE may expect that all overlapping UL resources may correspond to the same beam and/or spatial relation information.

In some implementations, a UE may transmit a PUCCH and a PUSCH which fully or partially overlap each other simultaneously. Further, the UE may not multiplex the UCI on the PUSCH and may transmit the PUCCH and the PUSCH simultaneously. For example, if some multiplexing timeline requirements are not met, the UE may transmit the PUCCH and the PUSCH instead of performing the multiplexing. For example, even if the PUCCH and the PUSCH are configured with priorities, the UE may transmit the PUCCH and the PUSCH simultaneously, instead of performing the multiplexing. For example, if the UCI type in the PUCCH is an SR, the UE may transmit the PUCCH and the PUSCH simultaneously. For example, if the UCI type in the PUCCH is a HARQ-ACK which is in response to an SPS-PDSCH only, the UE may transmit the PUCCH and the PUSCH simultaneously. For example, if the UCI on the PUCCH is aperiodic CSI, the UE may transmit the PUCCH and the PUSCH simultaneously. For example, if the PUCCH carries CSI associated with TRP #1 and the PUSCH is configured with beam/spatial relation information associated with TRP #2, the CSI may not multiplex on the PUSCH.

In some implementations, the PUCCH and the PUSCH, which fully or partially overlap each other in the time and/or frequency domain, may be transmitted simultaneously using different beams or spatial relation information. If the power difference configured for the PUCCH and the PUSCH is above a threshold, the UE may transmit the PUCCH and the PUSCH simultaneously. In another example, if the power difference configured for the PUCCH and the PUSCH is below a threshold, the UE may transmit the PUCCH and the PUSCH simultaneously. In some other implementations, if at least one of the PUCCH and the PUSCH is a repetition transmission, the UE may transmit the PUCCH and the PUSCH simultaneously.

In some implementations, a UE may postpone the transmission of the PUCCH and/or the PUSCH if the PUCCH and the PUSCH using different beams fully or partially overlap each other in the time and/or frequency domain. For example, the UE may postpone the transmission after receiving an indication, where the indication may be a specific parameter, a specific configuration, a MAC CE, a specific DCI format, a specific DCI format field, a DCI format scrambled by a specific RNTI, DCI scheduling the PUCCH, and/or a UL grant scheduling the PUSCH. If the transmission is postponed, an additional processing time period may be configured/defined. For example, the postponed transmission may be delayed by at least the additional processing time period. For example, the transmission may be postponed Y symbols, where Y may be configured by the higher layer, or may be indicated by a MAC CE, a DCI format field, and/or a pre-defined value. In some implementations, if the transmission of the PUCCH and/or the PUSCH is postponed/delayed, it means that the transmission does not occur at the originally configured radio resource location, but may occur in the next available sub-slot/slot/UL resource/specific resource configured with the same beam as that for the postponed transmission.

In some implementations, a channel that is not transmitted may mean that the channel has been dropped or the transmission of the channel has been postponed.

In some implementations, a UE may only transmit one of the PUCCH and the PUSCH, which fully or partially overlap each other, when certain condition(s) is met. For example, the condition may be that the timeline requirement(s) is not met. If the timeline requirement is not met, the UE may transmit the PUCCH or the PUSCH instead of performing the (UCI) multiplexing. For example, the condition may be that a specific indication is received. The indication may be a specific parameter, a specific configuration, a MAC CE, a specific DCI format, a specific DCI format field, a DCI format scrambled with a specific RNTI, DCI scheduling the PUCCH, and/or a UL grant scheduling the PUSCH. In some implementations, the condition may depend on the priority information configured for the PUCCH and/or the PUSCH. For example, the PUCCH and the PUSCH may be configured with different priorities. For example, the PUCCH and the PUSCH may be configured with the same priority. For example, at least one of the PUCCH and PUSCH may be configured with a respective priority. Given this, the PUCCH/PUSCH with the higher priority may be transmitted. In some implementations, if only the PUCCH or the PUSCH is configured with a priority, then only the one configured with the priority may be transmitted.

In some implementations, the condition may be related to a power control setting. For example, one of the PUCCH and the PUSCH that is with the higher power level may be transmitted. For example, the power control parameters for different resources may be different. For example, the power difference between different channels may be below/above a threshold. For example, the path loss for one of the channels may be larger than a threshold.

In some implementations, the condition may be that the PUCCH and/or the PUSCH is a repetition transmission. For example, if the PUCCH is a repetition transmission, the PUSCH may be transmitted. For example, if the PUCCH is a repetition transmission, the PUSCH may not be transmitted. For example, if the PUSCH is a repetition transmission, the PUCCH may be transmitted. For example, if the PUSCH is a repetition transmission, the PUCCH may not be transmitted.

In some implementations, the condition may be that the PUSCH is a configured grant transmission. In some implementations, the condition may be dependent on the UCI content (e.g., SR, LRR, Type 1 HARQ-ACK codebook, Type 2 HARQ-ACK codebook, Type 3 HARQ-ACK codebook, HARQ-ACK in response to SPS PDSCH only, P-CSI, Semi-persistence CSI, Aperiodic CSI). Certain types of UCI content may be prioritized for transmission, and the PUSCH may not be transmitted. In some implementations, the condition may be related to alpha offset and/or beta offset value(s). The alpha offset and beta offset values may be related to how many resources in the PUSCH may be reserved for the UCI. For example, the specific value may be configured/indicated, or the value may be smaller/larger than a specific value. For example, when such criteria are met, the PUSCH or the PUCCH may be transmitted.

In some implementations, a UE may only transmit one of the PUCCH and PUSCH, irrespective of whether the above-mentioned condition(s) is met. For example, the UE may multiplex the UCI on the PUSCH using beam #1. For example, the UE may multiplex the UCI on the PUSCH using beam #2. For example, the UE may multiplex the UCI on the PUSCH using an indicated beam that is other than beam #1 and beam #2. For example, the indicated beam may be indicated through a specific parameter, a specific configuration, a MAC CE, a specific DCI format, a specific DCI format field, a DCI format scrambled with a specific RNTI, DCI scheduling the PUCCH, and/or a UL grant scheduling the PUSCH.

In another example, the indicated beam may be a default beam determined based on a (pre-)configured/(pre-)determined rule. For example, a UE may transmit the PUCCH using beam #1 and drop the PUSCH. For example, a UE may transmit the PUCCH using beam #2 and drop the PUSCH. For example, a UE may transmit a PUCCH using a default beam or or a beam towards a default TRP when the PUCCH overlaps a UL channel, e.g., a PUSCH, using a beam or a TRP other than the default beam or the default TRP. Alternatively, a UE may transmit a PUSCH using a default beam or a beam towards a default TRP when the PUSCH overlaps a UL channel, e.g., a PUCCH, using a beam or a TRP other than the default beam or the default TRP. For example, the UE may transmit the PUCCH using an indicated beam that is other than beam #1 and beam #2. For example, the UE may determine to transmit the PUCCH or the PUSCH based on an indication. For example, a specific beam may be associated with a specific priority. For example, beam #1 may have a higher priority than beam #2. For example, if a first UL channel with a first beam identified as having a low priority overlaps a second UL channel with a second beam identified as having a high priority, the first channel may be prioritized/transmitted, and the second channel may be dropped/postponed. For example, the UE may always determine to transmit the PUCCH. For example, the UE may always determine to transmit the PUSCH. For example, the UE may always transmit the earliest channel. The earliest channel may be defined as the channel with the earliest first symbol among the concerned channels. The earliest symbol for a channel may be defined as the first symbol in the time domain among all of its occupied symbols.

In some implementations, multiple non-overlapping PUCCHs may overlap at least one PUSCH. The multiple non-overlapping PUCCHs may be configured with the same or different UCI types. One or more of the multiple non-overlapping PUCCHs may be PUCCH repetitions for transmitting the same UCI content. The PUSCH transmission may be one of the PUSCH repetitions for transmitting the same transport block. The PUSCH transmission may be transmitted by applying a beam that is the same as the beam used for the at least one of PUCCH transmissions.

Figure 8:
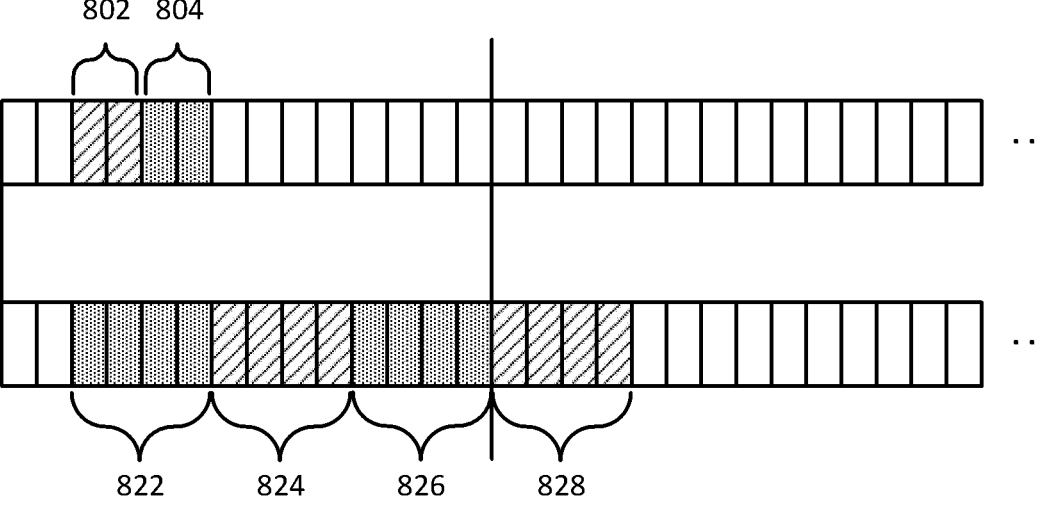
FIG. 8 is a diagram illustrating non-overlapping PUCCHs overlapping at least one PUSCH repetition, according to an example implementation of the present disclosure.

FIG. 8 is a diagram illustrating non-overlapping PUCCHs overlapping at least one PUSCH repetition, according to an example implementation of the present disclosure. Each rectangle in the diagram may represent a symbol.

As illustrated in FIG. 8, the PUCCH 802 that is transmitted using beam #1 and the PUCCH that is transmitted using beam #2 overlap the Type-B PUSCH repetition 822 that is transmitted using beam #2. After the PUSCH repetition 822, a transmission of the PUSCH repetition 824 using beam #1 is performed, then a transmission of the PUSCH repetition 826 using beam #2 is performed, and then a transmission of the PUSCH repetition 828 using beam #1 is performed.

Figure 9:
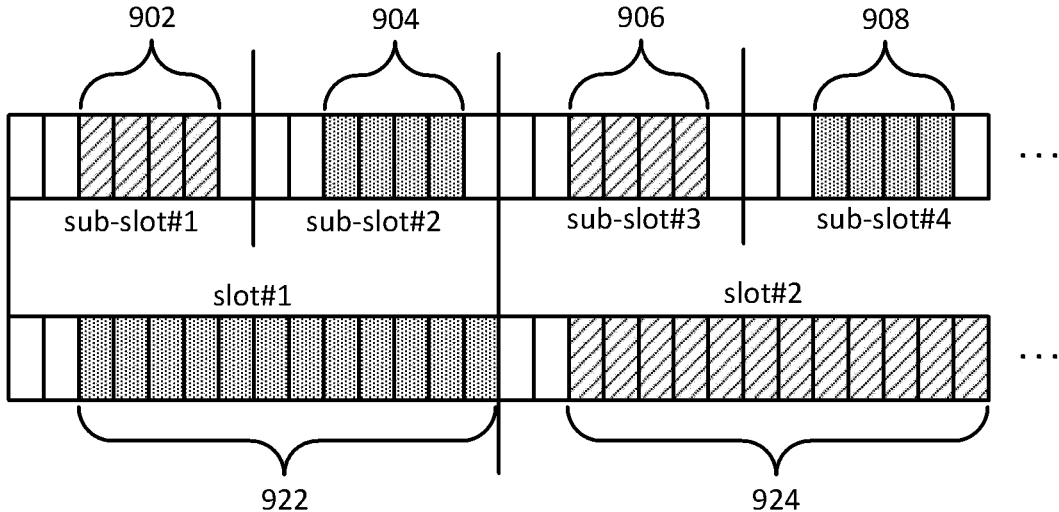
FIG. 9 is a diagram illustrating non-slot-based PUCCH repetitions overlapping at least one PUSCH repetition, according to an example implementation of the present disclosure.

FIG. 9 is a diagram illustrating non-slot-based PUCCH repetitions overlapping at least one PUSCH repetition, according to an example implementation of the present disclosure. Each rectangle in the diagram may represent a symbol.

As illustrated in FIG. 9, PUCCH repetition 902 transmitted using beam #1 in sub-slot #1 and PUCCH repetition 904 transmitted using beam #2 in sub-slot #2 overlap PUSCH repetition 922 transmitted using beam #2 in the first slot. PUCCH repetition 906 transmitted using beam #1 in sub-slot #3 and PUCCH repetition 908 transmitted using beam #2 in sub-slot #4 overlap PUSCH repetition 924 transmitted using beam #1 in the second slot.

In some implementations, a UE may multiplex the UCI of PUCCH(s) on a PUSCH that corresponds to the same beam with the PUCCH and then transmit the PUSCH, where not all of the PUCCH(s) are transmitted. The UCI of the associated PUCCH may be configured with a transmission beam that is the same as the one used for the PUSCH transmission. In some implementations, a group of overlapping UL resources may be classified into multiple groups, and resources in each group may correspond to the same beam. That is, different groups may correspond to different beams. In some implementations, each group may have an associated index. In some implementations, the multiplexed UCI may or may not include the UCI in all the PUCCHs. In some implementations, the multiplexed UCI may only include the UCI in the PUCCH(s) the transmission beam of which is the same as the PUSCH transmission beam. In some implementations, the multiplexed UCI may only include the UCI in the PUCCH corresponding to the same priority.

In some implementations, the UCI that has to be multiplexed may be indicated by an indication. In some implementations, from the UE's perspective, if the UCI is obtained from a respective PUCCH (e.g., the first UCI is obtained from a first PUCCH transmitted using a first beam and the second UCI is obtained from a second PUCCH transmitted using a second beam), whether to multiplex the first UCI and/or the second UCI on the PUSCH may depend on an indication received, for example, from the network. In some implementations, the UCI that has to be multiplexed may be configured. For example, from the UE's perspective, if the UCI is obtained from a respective PUCCH (e.g., the first UCI is obtained from a first PUCCH transmitted using a first beam and the second UCI is obtained from a second PUCCH transmitted using a second beam), whether to multiplex the first UCI and/or the second UCI on the PUSCH may be configured by a higher layer. In some implementations, the UCI that has to be multiplexed may be pre-defined. For example, from the UE's perspective, if the UCI is obtained from a respective PUCCH (e.g., the first UCI is obtained from a first PUCCH transmitted using a first beam and the second UCI is obtained from a second PUCCH transmitted using a second beam), whether to multiplex the first UCI and/or the second UCI on the PUSCH may be defined by a pre-defined rule (e.g., only multiplex the first UCI or only multiplex the UCI corresponding to the same beam as the beam used for the PUSCH).

In some implementations, a UE may multiplex the UCI from a PUCCH transmission with the same beam as a PUSCH transmission beam in a PUSCH and may drop the PUCCH. The UE may transmit the PUSCH and the PUCCH(s) the transmission beam(s) of which is different from the PUSCH transmission beam. The UE may not transmit the PUCCH(s) the transmission beam(s) of which is the same as the PUSCH transmission beam. In some implementations, a group of overlapping UL resources may be classified into multiple groups, and resources in each group may correspond to the same transmission beam. In other words, different groups may correspond to different beams. Different groups may correspond to different sets of Q (functions) for a multiplexing procedure. Each set Q may be used for a multiplexing procedure, and each UL resource may correspond to a Q with an index. During the multiplexing procedure, the overlapping resources in each set Q may need to be multiplexed in one of the sets Q. After the multiplexing procedure, the Qs in the set Q may not be expected to overlap each other. For example, overlapping UL resources with a first beam may correspond to Q(0), and overlapping UL resources with a second beam may correspond to Q(1). In some implementations, simultaneous transmission of the PUCCH and the PUSCH corresponding to different beams may be configured, indicated, and/or reported as a capability.

In some implementations, a UE may multiplex the UCI on the PUSCH regardless of whether the beams are the same or different. For example, the UE may multiplex the UCI on the PUSCH using the beam associated with the PUCCH(s). For example, the UE may multiplex the UCI on the PUSCH using the beam associated with the PUSCH. For example, the UE may multiplex the UCI on the PUSCH using an indicated beam, where the indicated beam may or may not be the same as the beam associated with the PUCCH(s) or the PUSCH. The indicated beam may be a default beam determined based on a (pre-)configured/(pre-)determined rule.

In some implementations, a UE may postpone at least one of the transmissions of the PUCCHs and PUSCH. For example, the UE may postpone part of or all of the overlapping PUCCHs. In some implementations, which PUCCH resource is postponed may be based on the order of resources in the time domain. In some implementations, the UE may postpone the latest a PUCCH(s) transmission among the overlapping PUCCHs. In some implementations, a UE may postpone the earliest PUCCH(s) transmission among the overlapping PUCCHs. In some implementations, which PUCCH resource is postponed may be determined based on an indication. In some implementations, the UE may only postpone the slot-based transmission. The slot-based transmission may be a PUSCH transmission and/or a PUCCH transmission. In some implementations, the UE may postpone the PUCCHs the transmission beam(s) of which is different from that of the PUSCH. In some implementations, after performing a postponement, the UE may not expect the UL resources with different beams to overlap each other.

In some implementations, a UE may only transmit one of the multiple non-overlapping PUCCHs and/or the PUSCH when at least one of the following conditions (a)-(e) is met.

(a) all PUCCHs are associated with different priorities with the PUSCH.

(b) UCI types of all the PUCCHs are the same.

(c) UCI types of all the PUCCHs are different.

(d) priorities of the UCI types in all the PUCCHs are different.

(e) priorities of the UCI types in all the PUCCHs are the same.

In some implementations, a UE may only transmit one of the multiple non-overlapping PUCCHs and/or the PUSCH without considering whether any of the above-mentioned conditions (a)-(e) is met. For example, the UE may transmit all the PUCCHs corresponding to a beam, and the beam may be the same as that for the earliest PUCCH among the PUCCHs. For example, the UE may transmit all the PUCCHs corresponding to a beam, and the beam may be the same as that for the latest PUCCH among the PUCCHs in the time domain. For example, the UE may transmit all the PUCCHs corresponding to a random beam. For example, the UE may transmit all the PUCCHs corresponding to an indicated beam. For example, the UE may transmit the PUSCH corresponding to a beam, and the beam may be the same as that for the earliest PUCCH among the PUCCHs in the time domain. For example, the UE may transmit the PUSCH corresponding to a beam, and the beam may be the same as that for the latest PUCCH among the PUCCHs in the time domain. For example, the UE may transmit the PUSCH corresponding to a beam, and the beam may be the same as that for the PUCCH which is fully overlapped with the PUSCH. For example, the UE may transmit the PUSCH corresponding to a beam that is originally indicated for the PUSCH.

In some implementations, each non-overlapping PUCCHs in a slot may correspond to a respective one of multiple beams. In some implementations, a UCI type may be configured in the non-overlapping PUCCHs in a slot/sub-slot. In some implementations, the non-overlapping PUCCHs may not be a PUCCH repetition. In some implementations, if the same UCI types are configured in different PUCCHs, the PUCCHs may correspond to different priorities. In some implementations, when a set of PUCCHs is configured, at least one of the PUCCHs may be configured in sub-slot-based transmission, and the other PUCCHs in the set may be configured in slot-based transmission. In some implementations, when multiple sets of PUCCHs are configured, at least one of sets of PUCCHs may be configured in sub-slot-based transmission, and the other sets of PUCCHs may be configured in slot-based transmission.

In some implementations, multiple non-overlapping PUCCHs may overlap one PUSCH. The multiple non-overlapping PUCCHs may be transmitted using the same or different UCI types. One or more of the multiple non-overlapping PUCCHs may be from PUCCH repetitions for transmitting the same UCI content. The PUSCH transmission may be one of the PUSCH repetitions for transmitting the same transport block. The PUSCH transmission may be performed using a first beam, and none of the multiple non-overlapping PUCCHs may be configured/indicated to be transmitted using the first beam.

Figure 10:
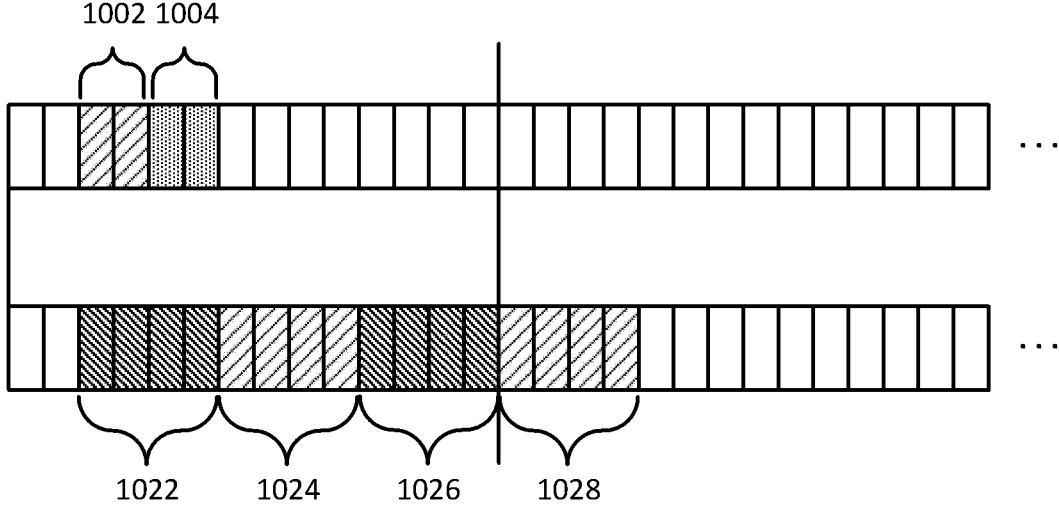
FIG. 10 is a diagram illustrating that non-overlapping PUCCHs overlapping at least one PUSCH repetition in the time domain, according to an example implementation of the present disclosure.

FIG. 10 is a diagram illustrating that non-overlapping PUCCHs overlap at least one PUSCH repetition in the time domain, according to an example implementation of the present disclosure. Each rectangle in the diagram may represent a symbol. In FIG. 10, there are two (non-overlapping) PUCCHs 1002 and 1004 that overlap at least one PUSCH repetition (e.g., PUSCH repetition #1 1022) of a set of non-slot-based (or Type-B) PUSCH repetitions including PUSCH repetition #1 1022, PUSCH repetition #2 1024, PUSCH repetition #3 1026 and PUSCH repetition #4 1028. The PUCCH 1002 may be transmitted using a first beam (e.g., beam #1), and the PUCCH 1004 in the same slot may be transmitted using a second beam (e.g., beam #2). PUSCH repetition #1 1022 and PUSCH repetition #3 1026 may be transmitted using a third beam (e.g., beam #3). PUSCH repetition #2 1024 and PUSCH repetition #4 1028 may be transmitted using the first beam.

In the present disclosure, the first beam (e.g., beam #1), the second beam (e.g., beam #2), and the third beam (e.g., beam #3) may refer to three beams transmitted towards at least one TRP. For example, in a multi-TRP scenario, beam #1 may be transmitted towards TRP #1, beam #2 may be transmitted towards TRP #2, and beam #3 may be transmitted towards TRP #3, where TRP #1, TRP #2 and TRP #3 may be coupled to the same base station. In another example, at least two of beam #1, beam #2, and beam #3 may be transmitted towards the same TRP.

Figure 11:
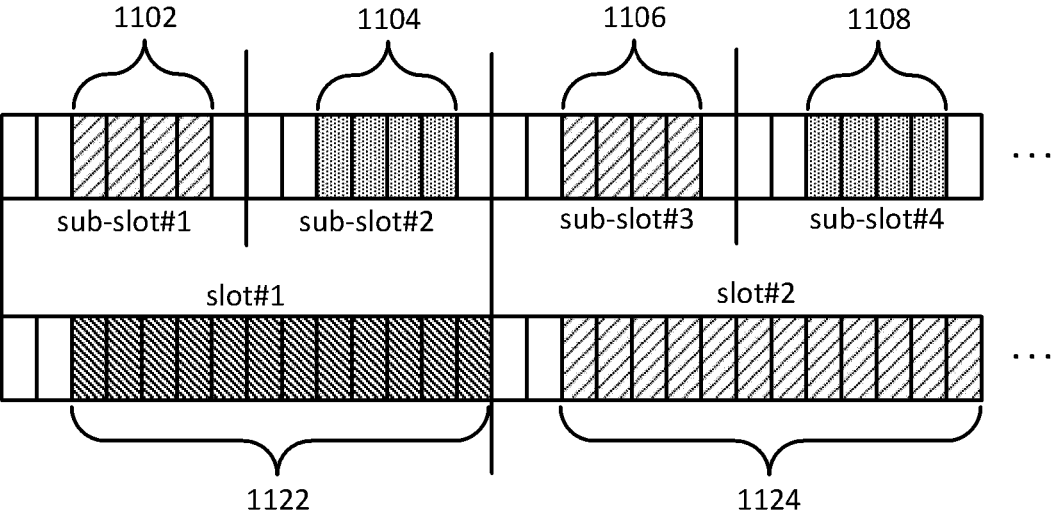
FIG. 11 is a diagram illustrating that non-slot-based PUCCH repetitions overlap at least one slot-based PUSCH repetition in the time domain, according to an example implementation of the present disclosure.

FIG. 11 is a diagram illustrating that non-slot-based PUCCH repetitions overlap at least one slot-based PUSCH repetition in the time domain, according to an example implementation of the present disclosure. Each rectangle in the diagram may represent a symbol. In FIG. 11, there are four non-slot-based PUCCH repetitions 1102, 1104, 1106, and 1108 that overlap a set of slot-based PUSCH repetitions including PUSCH repetitions 1122 and 1124. PUCCH repetition 1102 in sub-slot #1 of slot #1 and PUCCH repetition 1106 in sub-slot #3 of slot #2 may be transmitted using a first beam (e.g., beam #1). PUCCH repetition 1104 in sub-slot #2 of slot #1 and PUCCH repetition 1108 in sub-slot #4 of slot #2 may be transmitted using a second beam (e.g., beam #2). PUSCH repetition 1122 in slot #1 may be transmitted using a third beam (e.g., beam #3). PUSCH repetition 1124 in slot #2 may be transmitted using the first beam.

In some implementations, a UE may multiplex UCI on the PUSCH regardless of whether beams are the same or different. In some implementations, the UE may multiplex the UCI on the PUSCH using a beam associated with the PUCCH(s). In some implementations, the beam may be associated with the first scheduled PUCCH. In some implementations, the beam may be associated with the last scheduled PUCCH. In some implementations, the beam may be associated with one of the non-overlapped PUCCH. In some implementations, the UE may multiplex the UCI on the PUSCH using a beam associated with the PUSCH.

In some implementations, the UE may multiplex the UCI on a PUSCH transmitted using a specific beam, where the beam may be dedicatedly configured by the network.

In some implementations, a UE may forgo performing the multiplexing procedure and transmit the PUCCH(s) and PUSCH simultaneously. The transmitted PUCCH(s) may or may not include all of the PUCCHs that overlap the PUSCH.

In some implementations, a UE may postpone at least one of the transmissions of the PUCCHs and the PUSCH. For example, the time location of the postponed PUSCH may be at least later than that of the overlapped PUCCHs (For example, if the PUSCH transmission is postponed, its new timing may be scheduled to occur after the timing allocated for the overlapped PUCCHs). In some implementations, the resource location of the postponed PUSCH may be at least later than the resource location of the first overlapped PUCCH. In some implementations, the resource location of the postponed PUSCH may be at least later than the resource location of the last overlapped PUCCH. In some implementations, the resource location of the postponed PUSCH may be at least later than the resource location of the indicated PUCCH.

In some implementations, a UE may only transmit one of the multiple non-overlapping PUCCHs and/or the PUSCH when certain conditions are met.

In some implementations, a UE may only transmit one of the multiple non-overlapping PUCCHs and/or the PUSCH unconditionally. Each of the multiple non-overlapping PUCCHs in a slot may correspond to a respective beam, and the beams may not be the same. The same or different UCI types may be configured in the non-overlapping PUCCHs in a slot.

In some implementations, a UE may not expect to multiplex the UCI on the PUSCH transmission with different beams in a slot/sub-slot.

In some implementations, among multiple overlapping PUCCHs, at least two beams for the PUCCHs may be selected for transmission. For example, beam #1 may be applied for a first PUCCH transmission, and beam #2 may be applied for the transmission of the remaining PUCCH(s). Beam #1 and beam #2 may be different. The multiple overlapping PUCCHs may be with the same or different UCI types. The UCI carried by the multiple overlapping PUCCHs may or may not be multiplexed in one or more PUCCH(s) for transmission. For example, the overlapping PUCCHs may refer to PUCCH resources which are configured before the multiplexing procedure is performed.

Figure 12:
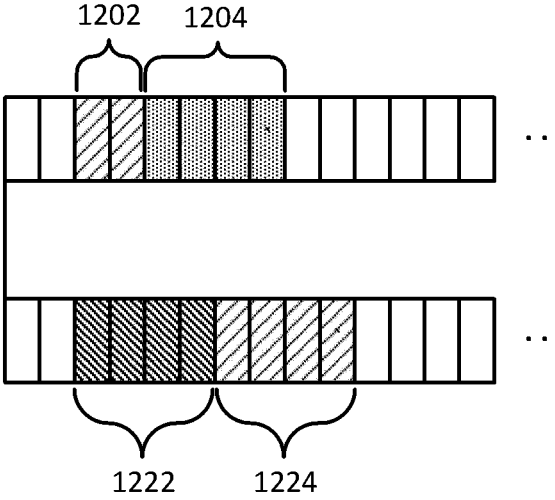
FIG. 12 is a diagram illustrating a number of overlapping PUCCHs transmitted using different beams, according to an example implementation of the present disclosure.

FIG. 12 is a diagram illustrating a number of overlapping PUCCHs transmitted using different beams, according to an example implementation of the present disclosure. Each rectangle in the diagram may represent a symbol. In FIG. 12, PUCCH 1222 overlaps PUCCHs 1202 and 1204 in the time domain, and PUCCH 1224 partially overlaps PUCCH 1204 in the time domain. Each PUCCH may correspond to a Q function (e.g., Q(j), as discussed above). For example, PUCCH 1202 may correspond to Q(0), PUCCH 1222 may correspond to Q(1), PUCCH 1202 may correspond to Q(2), and PUCCH 1224 may correspond to Q(3). PUCCHs 1202 and 1224 may be transmitted using a first beam (e.g., beam #1). PUCCH 1204 may be transmitted using a second beam (e.g., beam #2). PUCCH 1222 may be transmitted using a third beam (e.g., beam #3).

Figure 13:
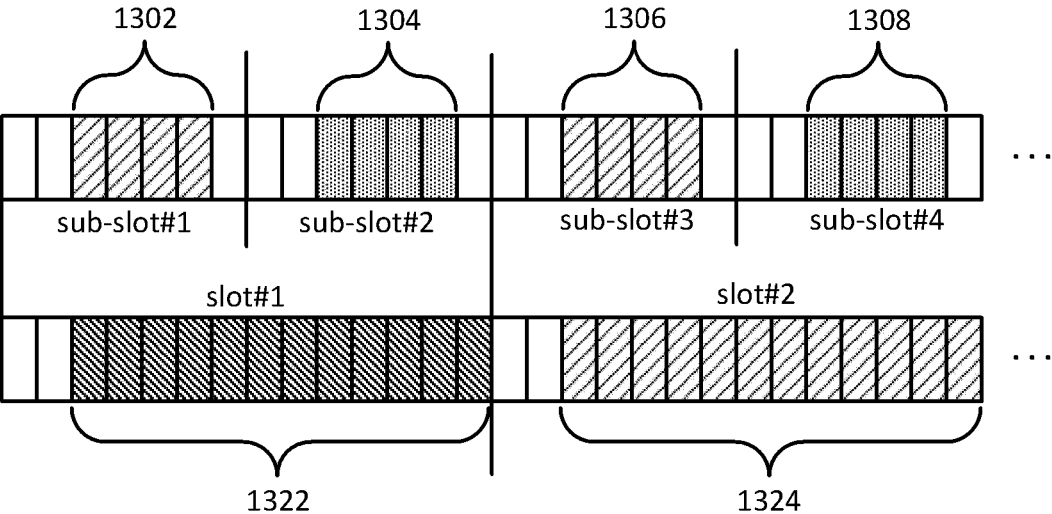
FIG. 13 is a diagram illustrating that non-slot-based PUCCH repetitions overlap at least one slot-based PUCCH repetition in the time domain, according to an example implementation of the present disclosure.

FIG. 13 is a diagram illustrating that non-slot-based PUCCH repetitions overlap at least one slot-based PUCCH repetition in the time domain, according to an example implementation of the present disclosure. Each rectangle in the diagram may represent a symbol. In FIG. 13, there are four non-slot-based PUCCH repetitions 1302, 1304, 1306, and 1308 that overlap a set of slot-based PUCCH repetitions including PUCCH repetitions 1322 and 1324. PUCCH repetition 1302 in sub-slot #1 of slot #1 and PUCCH repetition 1306 in sub-slot #3 of slot #2 may be transmitted using a first beam (e.g., beam #1). PUCCH repetition 1304 in sub-slot #2 of slot #1 and PUCCH repetition 1308 in sub-slot #4 of slot #2 may be transmitted using a second beam (e.g., beam #2). PUCCH repetition 1322 in slot #1 may be transmitted using a third beam (e.g., beam #3). PUCCH repetition 1324 in slot #2 may be transmitted using the first beam.

In some implementations, the same or different UCI types may be multiplexed in different PUCCHs. For example, a UE may perform multiplexing among the PUCCHs with different UCI types and not perform multiplexing among the PUCCHs with the same UCI type. For example, a UE may perform multiplexing among the PUCCHs with the same UCI types but with different PUCCH transmission beams. For example, a UE may perform multiplexing among the PUCCHs with different UCI types and with different PUCCH transmission beams. For example, a UE may perform multiplexing among the PUCCHs with different UCI types but with the same PUCCH transmission beam. For example, a UE may perform multiplexing among the PUCCHs with the same UCI types and with the same PUCCH transmission beam.

In some implementations, a UE may multiplex the UCI on the same PUCCH or different PUCCHs. For example, the UE may multiplex the UCI on the same PUCCH if the overlapped PUCCHs are configured/indicated with the same transmission beam. For example, the PUCCH that the UCI has to be multiplexed in may be determined by an indication, a configuration, the order of PUCCHs in the time domain, a PUCCH format, a code rate, the UCI types, or by the number of PUCCHs that use the same beam. For example, the UE may multiplex all the UCIs in a PUCCH, and the PUCCH may be configured/scheduled in a resource that is not overlapped with the group of overlapping PUCCHs. For example, the resource may or may not be configured/indicated with the same transmission beam as the overlapping PUCCHs. For example, the UE may multiplex a first UCI and a second UCI on a first PUCCH with a first transmission beam and may multiplex a third UCI and a fourth UCI on a second PUCCH with a second transmission beam, and so on. Preferably, a first UCI and a second UCI may have the same priority. Preferably, a third UCI and a fourth UCI may have the same priority. For example, if more than one PUCCH are configured/indicated a specific beam, the UE may transmit the PUCCH with the specific beam and not transmit other PUCCHs without the specific beam.

In some implementations, the UCI multiplexing procedure among the overlapping PUCCH resources may be performed separately for different TRPs. For example, after the UCI multiplexing procedure for the same TRP is performed, prioritization or multiplexing between the PUCCHs for different TRPs may be performed. Prioritization or multiplexing between the PUCCHs and the PUSCHs for different TRPs may then be performed. In some implementations, after the UCI multiplexing procedure for the same TRP is performed, prioritization or multiplexing between PUCCHs and PUSCHs for the same TRP may be performed. Prioritization or multiplexing between the PUCCHs and the PUSCHs for different TRPs may then be performed.

In some implementations, the UCI multiplexing procedure among overlapping PUCCH resources may be performed jointly for different TRPs. Prioritization or multiplexing between PUCCHs and PUSCHs for different TRP may then be performed.

In some implementations, a UE may only expect to multiplex UCI among overlapping PUCCHs with the same transmission beam over a PUCCH resource/transmission.

In some implementations, the pseudo-code for determining the set of resources for transmission of PUCCHs in a slot may consider beam(s) configured/indicated for the overlapping PUCCHs. Preferably, the pseudo code may be some steps to perform UCI multiplexing procedure. For example, different beams may be associated with different set Q. For example, if the overlapping PUCCHs include a PUCCH repetition among a number of PUCCH repetition transmissions, the PUCCH repetition may be transmitted by using a first beam, and other PUCCHs may be transmitted by using a second beam. For example, if the overlapping PUCCHs include a slot-based PUCCH repetition and a non-slot-based PUCCH repetition, the slot-based repetition may use a first beam for transmission and the non-slot-based PUCCH repetition may use a second beam for transmission. For example, if the UE is not provided multi-CSI-PUCCH-ResourceList, and a resource for a PUCCH transmission with HARQ-ACK information in response to SPS PDSCH reception and/or a resource for a PUCCH associated with a SR occasion overlap in time with two resources for respective PUCCH transmissions with two CSI reports, and there is no resource for a PUCCH transmission with HARQ-ACK information in response to a DCI format detection that overlaps in time with any of the previous resources, and the pseudo code results to the UE attempting to determine a single PUCCH resource from the HARQ-ACK and/or the SR resource and the two PUCCH resources with CSI reports. Specifically, the pseudo code may be used to perform UCI multiplexing procedure.

The UE may multiplex the HARQ-ACK information and/or the SR in the resource for the PUCCH transmission, which uses a first beam, with the CSI report having the higher priority, and transmit the PUCCH, which uses a second beam, with the CSI report having lower priority. The first beam may not be the same as the second beam. For example, if set Q to the set of resources for transmission of corresponding PUCCHs in a single slot without repetitions, where a resource with the earlier first symbol is placed before a resource with a later first symbol. For two resources with the same first symbol, the resource with a longer duration is placed before the resource with a shorter duration. For two resources with the same first symbol and the same duration, the order of the placement may be determined by the configured beams. More specifically, the beam may be used to determine the order of set Q. Alternatively, this step may be placed at the first or the second step.

For example, if the UE is not provided simultaneousH-ARQ-ACK-CSI and resources for transmission of HARQ-ACK information include PUCCH format 0 or PUCCH format 2, resources that include PUCCH format 2, or PUCCH format 3, or PUCCH format 4 for transmission of CSI reports are included in the set Q: if they overlap any resource from the resources for transmission of HARQ-ACK information and correspond to different beams.

For example, if the UE is not provided simultaneousH-ARQ-ACK-CSI and at least one of the resources for transmission of HARQ-ACK information includes PUCCH format 1, PUCCH format 3, or PUCCH format 4 resources that include PUCCH format 3 or PUCCH format 4 for transmission of CSI reports are included in the set Q: resources that include PUCCH format 2 for transmission of CSI reports are included from the set Q if they overlap any resource from the resources for transmission of HARQ-ACK information and correspond to different beams.

In some implementations, a multi-TRP-based PUCCH repetition may have higher priority than a single-TRP-based PUCCH repetition. Alternatively, a single-TRP based-PUCCH repetition may have higher priority than a multi-TRP-based PUCCH repetition.

In some implementations, if the overlapping PUCCHs have two priorities, a first priority may correspond to a first beam and a second priority may correspond to a second beam.

In some implementations, one PUCCH resource is assumed to overlap with multiple PUSCH resources. The multiple PUSCH resources are not overlapping. The PUCCH may be from PUCCH repetitions for transmitting the same UCI content. One or more multiple non-overlapping PUSCH transmissions may be one of PUSCH repetitions for transmitting the same information.

Figure 14:
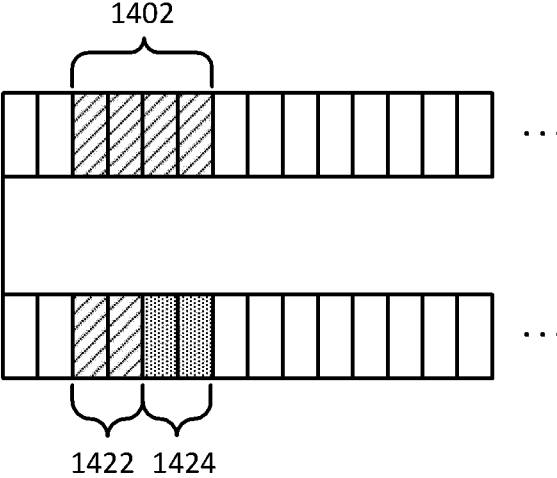
FIG. 14 is a diagram illustrating that a PUCCH overlaps a number of PUSCH repetitions in the time domain, according to an example implementation of the present disclosure.

FIG. 14 is a diagram illustrating that a PUCCH overlaps a number of PUSCH repetitions in the time domain, according to an example implementation of the present disclosure. Each rectangle in the diagram may represent a symbol. As illustrated in FIG. 14, PUCCH (resource) 1402 that is with UCI and transmitted using beam #1 may overlap PUSCH type B repetition transmission 1422 corresponding to beam #1 and PUSCH type B repetition transmission 144 corresponding to beam #2.

In some implementations, a UE may multiplex the UCI of a PUCCH (e.g., PUCCH 1402) on a certain PUSCH (e.g., PUSCH repetition 1422 or 1424) if the beam for transmitting the PUSCH is the same as the beam for transmitting the PUCCH. Given this, the UE may forgo transmitting the PUCCH to avoid transmission collision.

In some implementations, a UE may multiplex the UCI on all of the PUSCHs that overlap the PUCCH when certain condition(s) is met. For example, the condition may be that the PUSCH is a PUSCH repetition transmitted based on cyclical mapping of beams. For example, if only beam #1 and beam #2 are transmitted in a beam sweeping cycle, the UE may transmit beam #1 and beam #2 in alternating order of [beam #1, beam #2, beam #1, beam #2, . . . ] if cyclical mapping is applied. In some implementations, the condition may be that the PUSCH is a PUSCH repetition transmitted based on sequential mapping of beams. For example, if only beam #1 and beam #2 are transmitted in a beam sweeping cycle, the UE may transmit beam #1 and beam #2 in sequential order of [beam #1, beam #1, beam #2, beam #2, . . . ] if sequential mapping is applied. In some implementations, the condition may be that the PUSCH is a PUSCH repetition that is transmitted based on a half-half beam mapping pattern for which beam #1 is used for transmitting the first half number of PUSCH repetitions and beam #2 is used for transmitting the rest number of PUSCH repetitions. In some implementations, the condition may be that the PUSCH is an actual PUSCH repetition. In some implementations, the condition may be that the PUSCH is a nominal PUSCH repetition.

In some implementations, a UE may multiplex the UCI only on the first overlapped PUSCH (e.g., PUSCH 1422 in FIG. 14). The first overlapped PUSCH may or may not use the same beam as the PUCCH that the PUSCH overlaps.

In some implementations, a UE may multiplex the UCI on the first PUSCH repetition corresponding to a first beam and the X-th PUSCH repetition corresponding to a second beam. For example, X may be 1. For example, X may correspond to the first available actual PUSCH repetition corresponding to a second beam. For example, X may be configured, pre-defined, and/or indicated. For example, the first beam may not be the same as the second beam.

In some implementations, the UCI multiplexing procedure (e.g., in which the UE multiplexes the UCI of a PUCCH on at least one specific UL resource) among overlapping PUCCHs may be performed after resolving the overlapping PUCCH resources and PUSCH resources for different TRPs. Specifically, resolving may refer to multiplexing, dropping, and/or prioritization. In some implementations, one or more non-overlapping PUCCHs may be selected from a number of PUCCH repetitions for transmitting the same UCI content. One or more PUSCH transmissions may be one of a number of PUSCH repetitions for transmitting the same transport block.

Figure 15:
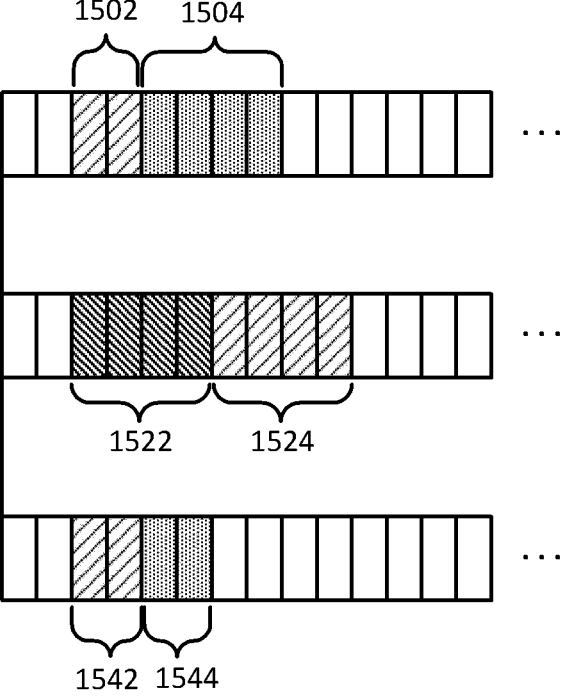
FIG. 15 is a diagram illustrating that multiple overlapping PUCCHs overlapping type B PUSCH repetitions, according to an example implementation of the present disclosure.

FIG. 15 is a diagram illustrating that multiple overlapping PUCCHs overlap type B PUSCH repetitions, according to an example implementation of the present disclosure. Each rectangle in the diagram may represent a symbol. As illustrated in FIG. 15, there are multiple PUCCHs overlapping with each other in the time domain, and the multiple PUCCHs may be in the same cell or different cells. These PUCCHs are referred to as overlapping PUCCHs in the present disclosure. For example, PUCCH 1522 overlaps PUCCHs 1502 and 1504 in the time domain, PUCCH 1524 partially overlaps PUCCH 1504 in the time domain. Each PUCCH may correspond to a Q function (e.g., Q(j)). For example, PUCCH 1502 may correspond to Q(0), PUCCH 1522 may correspond to Q(1), PUCCH 1504 may correspond to Q(2), and PUCCH 1524 may correspond to Q(3). Further, PUCCHs 1502 and 1524 may be transmitted using a first beam (e.g., beam #1). PUCCH 1504 may be transmitted using a second beam (e.g., beam #2). PUCCH 1522 may be transmitted using a third beam (e.g., beam #3).

Before the UCI multiplexing procedure is performed, the overlapping PUCCHs may overlap at least one PUSCH repetition in the time domain. As illustrated in FIG. 15, PUCCHs 1502 and 1522 may overlap PUSCH repetition 1542 (e.g., transmitted using beam #1) in the time domain, and PUCCHs 1504 and 1522 overlap PUSCH repetition 1544 (e.g., transmitted using beam #2). As described above, part or all of the overlapping PUCCHs 1502, 1504, 1522, and 1524 may not be transmitted if the UE has performed the UCI multiplexing procedure to multiplex the UCI on the PUSCH repetition(s) since the UCI has been carried by PUSCH repetition(s).

In some implementations, a UE may perform UCI multiplexing on multiple overlapping PUCCHs at first and determine to multiplex the UCI on PUSCH(s) with the same transmission beam(s) as the overlapping PUCCHs. For example, the overlapping PUCCHs may be grouped into two groups that are transmitted using beam #1 and beam #2, respectively. The UE may multiplex the UCI on a first PUSCH transmitted using beam #1 and multiplex the UCI on a second PUSCH transmitted using beam #2.

In some implementations, a UE may perform UCI multiplexing between overlapping PUCCHs at first and determine to multiplex the UCI on the first PUSCH transmission (in the time domain) next.

In some implementations, a UE may perform UCI multiplexing between overlapping PUCCHs at first and determine to multiplex the UCI on the first PUSCH repetition corresponding to a first beam and the X-th PUSCH repetition corresponding to a second beam next.

In some implementations, a UE may perform UCI multiplexing between overlapping PUCCHs at first and determine to multiplex the UCI on all overlapped PUS CHs next. For example, UCI multiplexing between overlapping PUCCHs for the same TRP may be performed first, and UCI multiplexing between overlapping PUCCHs for different TRP may be performed next. Alternatively, UCI multiplexing between overlapping PUCCHs for different TRP may be performed first, and UCI multiplexing between overlapping PUCCHs for the same TRP may be performed next. For example, UCI multiplexing between overlapping PUCCHs and PUSCHs for the same TRP may be performed first, and UCI multiplexing between overlapping PUCCHs and PUSCHs for different TRP may be performed next. Alternatively, UCI multiplexing between overlapping PUCCHs and PUSCHs for different TRP may be performed first, and UCI multiplexing between overlapping PUCCHs and PUSCHs for the same TRP may be performed next.

In some implementations, a UE may perform UCI multiplexing to multiplex the UCI on certain PUSCH(s). Given this, only the PUSCH(s) multiplexed with the UCI may be transmitted, while the PUSCH(s) that are not multiplexed with the UCI may be dropped.

In some implementations, a UE may perform UCI multiplexing in the PUSCHs at first and transmit at least one of the PUSCHs next. For example, the PUSCH selected for transmission may be based on a PUSCH repetition type. For example, the PUSCH selected for transmission may be determined based on a PUSCH duration. For example, the PUSCH selected for transmission may be determined based on a PUSCH mapping type. For example, the PUSCH selected for transmission may be determined based on whether A-CSI is multiplexed or not.

FIG. 16 is a flowchart of a wireless communication method 1600 performed by a UE for handling radio resource collision, according to an example implementation of the present disclosure. Although actions 1602, 1604, 1606, 1608, and 1610 are illustrated as separate actions represented as independent blocks in FIG. 16, these separately illustrated actions should not be construed as necessarily order-dependent. The order in which the actions are performed in FIG. 16 is not intended to be construed as a limitation, and any number of the disclosed blocks may be combined in any order to implement the method, or an alternate method. Moreover, each of actions 1602, 1604, 1606, 1608, and 1610 may be performed independent of other actions, and may be omitted in some implementations of the present disclosure.

In action 1602, the UE may receive at least one beam indication that indicates a first beam for transmitting a first PUSCH and a second beam for transmitting a second PUSCH. In some implementations, the beam indication may be any information that specifies the correspondence between the beams and the PUSCHs. For example, the beam indication may be contained in DCI/MAC/RRC signaling.

In action 1604, the UE may obtain UCI to be transmitted on a PUCCH.

In action 1606, the UE may multiplex the UCI on at least one of the first PUSCH and the second PUSCH in a case that the PUCCH overlaps at least one of the first PUSCH and the second PUSCH in the time domain.

In action 1608, the UE may transmit the first PUSCH using the first beam.

In action 1610, the UE may transmit the second PUSCH using the second beam.

In some implementations, the UE may further forgo transmitting the PUCCH in a case that the PUCCH overlaps at least one of the first PUSCH and the second PUSCH in the time domain.

In some implementations, the UE may be operated in the multi-TRP scenario. For example, the UE may communicate with a set of TRPs including a first TRP and a second TRP, where the UE may communicate with the first TRP using the first beam and communicate with the second TRP using the second beam.

In some implementations, the PUCCH may be scheduled for a dynamic PUCCH transmission. The dynamic PUCCH transmission may be considered as a one-shot transmission that is dynamically triggered/scheduled by specific signaling from the network.

In some implementations, the PUCCH may be configured for a transmission of a PUCCH repetition. The PUCCH may be one of a set of PUCCH repetitions.

In some implementations, at least one of the first PUSCH and the second PUSCH may be scheduled for a dynamic PUSCH transmission. The dynamic PUSCH transmission may be considered as a one-shot transmission that is dynamically triggered/scheduled by specific signaling from the network.

In some implementations, at least one of the first PUSCH and the second PUSCH may be scheduled for a transmission of a PUSCH repetition. That is, the first PUSCH may be one of a set of PUCCH repetitions, and/or the second PUSCH may be one of a set of PUCCH repetitions.

In some implementations, the UE may sequentially transmit the first beam and the second beam in a beam sweeping cycle of transmitting a set of beams including the first beam and the second beam. For example, the first beam and the second beam may be transmitted based on sequential mapping.

In some implementations, the UE may transmit the first beam and the second beam according to a predetermined cyclic order in a beam sweeping cycle of transmitting a set of beams including the first beam and the second beam. For example, the first beam and the second beam may be transmitted based on cyclical mapping.

In some implementations, the first PUSCH and the second PUSCH are transmitted in a same time slot. For example, the first PUSCH and the second PUSCH are non-slot-based PUSCH repetitions.

In some implementations, the first PUSCH and the second PUSCH are transmitted in different time slots. For example, the first PUSCH and the second PUSCH are slot-based PUSCH repetitions.

Consequently, even if the resource collision of the control channel(s) and data channel(s) happens (e.g., the PUCCH partially or fully overlaps at least one of the first PUSCH and the second PUSCH in the time domain), the UE may choose not to transmit the collided control channel (e.g., PUCCH) because the UE may multiplex the UCI of the collided control channel on the data channel(s) (e.g., the first PUSCH and/or second PUSCH). Given this, the UE may still transmit the control signaling to the network without dropping/ postponing the transmission of user data if the resource collision happens. Compared with the conventional transmission mechanism in which the control channel is always given a higher priority for transmission, the above-mentioned mechanisms may reduce signaling overhead, improve data transmission efficiency and enhance radio resource utilization.

Figure 17:
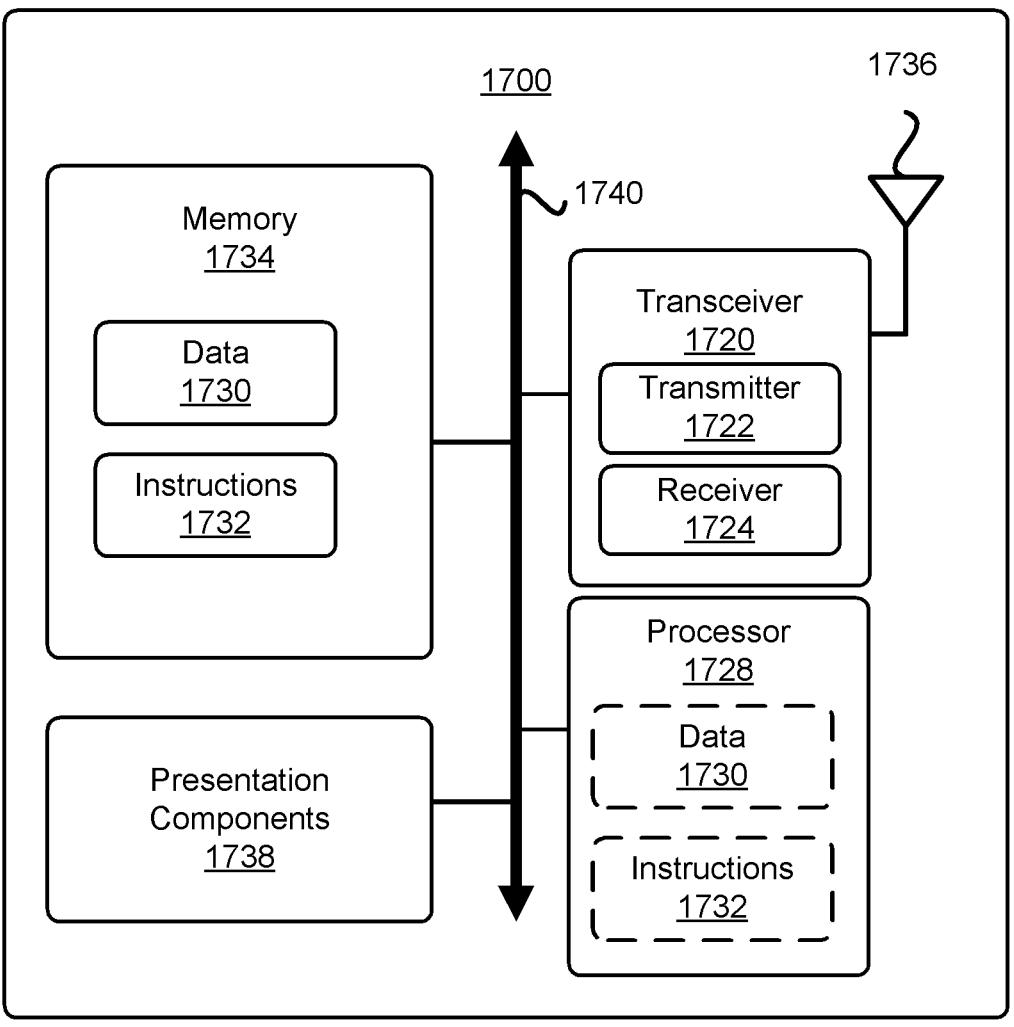
FIG. 17 is a block diagram illustrating a node for wireless communication, according to an example implementation of the present disclosure.

FIG. 17 is a block diagram illustrating a node 1700 for wireless communication, according to an example implementation of the present disclosure. As illustrated in FIG. 17, a node 1700 may include a transceiver 1720, a processor 1728, a memory 1734, one or more presentation components 1738, and at least one antenna 1736. The node 1700 may also include a radio frequency (RF) spectrum band module, a BS communications module, a network communications module, and a system communications management module, Input/Output (I/O) ports, I/O components, and a power supply (not illustrated in FIG. 17).

Each of the components may directly or indirectly communicate with each other over one or more buses 1740. The node 1700 may be a UE or a BS that performs various functions disclosed with reference to FIGS. 1 through 16.

The transceiver 1720 has a transmitter 1722 (e.g., transmitting/transmission circuitry) and a receiver 1724 (e.g., receiving/reception circuitry) and may be configured to transmit and/or receive time and/or frequency resource partitioning information. The transceiver 1720 may be configured to transmit in different types of subframes and slots including but not limited to usable, non-usable and flexibly usable subframes and slot formats. The transceiver 1720 may be configured to receive data and control channels.

The node 1700 may include a variety of computer-readable media. Computer-readable media may be any available media that may be accessed by the node 1700 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information, such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave or other transport mechanisms, and include any information delivery media.

The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the previously listed components should also be included within the scope of computer-readable media.

The memory 1734 may include computer-storage media in the form of volatile and/or non-volatile memory. The memory 1734 may be removable, non-removable, or a combination thereof. An example memory may include solid-state memory, hard drives, optical-disc drives, etc. As illustrated in FIG. 17, the memory 1734 may store one or more computer-readable and/or computer-executable instructions 1732 (e.g., software codes or programs) that are configured to, when executed, cause the processor 1728 to perform various functions disclosed herein, for example, with reference to FIGS. 1 through 16. Alternatively, the instruction(s) 1732 may not be directly executable by the processor 1728 but may be configured to cause the node 1700 (e.g., when compiled and executed) to perform various functions disclosed herein.

The processor 1728 (e.g., having processing circuitry) may include an intelligent hardware device, e.g., a Central Processing Unit (CPU), a microcontroller, an ASIC, etc. The processor 1728 may include memory. The processor 1728 may process the data 1730 and the instruction(s) 1732 received from the memory 1738, and information transmitted and received via the transceiver 1720, the baseband communications module, and/or the network communications module. The processor 1728 may also process information to send to the transceiver 1720 for transmission via the antenna 1736 to the network communications module for transmission to a CN.

One or more presentation components 1738 may present data indications to a person or another device. Examples of presentation components 1738 may include a display device, a speaker, a printing component, a vibrating component, etc.

In view of the present disclosure, various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A wireless communication method performed by a User Equipment (UE) for handling radio resource collisions, the wireless communication method comprising:

receiving a Radio Resource Control (RRC) configuration indicating a first Control Resource Set (CORESET) pool index associated with a Physical Uplink Control Channel (PUCCH) designated to carry Uplink Control Information (UCI);

determining whether the PUCCH overlaps one or more Physical Uplink Shared Channels (PUSCHs) in time domain;

after determining that the PUCCH overlaps at least one of the one or more PUSCHs in the time domain, multiplexing the UCI on a particular PUSCH of the one or more PUSCHs that is associated with the first CORESET pool index; and transmitting the multiplexed UCI via the particular PUSCH.

2. The wireless communication method according to claim 1, further comprising:

dropping a transmission of the PUCCH after determining that the PUCCH overlaps the at least one of the one or more PUSCHs in the time domain.

3. The wireless communication method according to claim 1, wherein:

the RRC configuration further indicates a second CORESET pool index, the first CORESET pool index is associated with a first Transmission Reception Point (TRP), and the second CORESET pool index is associated with a second TRP.

4. The wireless communication method according to claim 1, wherein the PUCCH is scheduled for a dynamic PUCCH transmission.

5. The wireless communication method according to claim 1, wherein the PUCCH is scheduled for a transmission of a PUCCH repetition.

6. The wireless communication method according to claim 1, wherein each PUSCH of the one or more PUSCHs is scheduled by a respective Physical Downlink Control Channel (PDCCH).

7. The wireless communication method according to claim 1, wherein the particular PUSCH is scheduled for a transmission of a PUSCH repetition.

8. The wireless communication method according to claim 1, further comprising:

transmitting the one or more PUSCHs according to a predetermined sequential order in a beam sweeping cycle after determining that the PUCCH overlaps the at least one of the one or more PUSCHs in the time domain, wherein each PUSCH of the one or more PUSCHs is associated with a respective beam.

9. The wireless communication method according to claim 1, further comprising:

transmitting the one or more PUSCHs according to a predetermined cyclic order in a beam sweeping cycle after determining that the PUCCH overlaps the at least one of the one or more PUSCHs in the time domain, wherein each PUSCH of the one or more PUSCHs is associated with a respective beam.

10. The wireless communication method according to claim 1, wherein the UCI includes Hybrid Automatic Repeat Request (HARQ)-Acknowledgment (ACK) information.

11. A User Equipment (UE) for handling radio resource collisions, the UE comprising:

at least one processor; and at least one non-transitory machine-readable medium coupled to the at least one processor and storing one or more computer-executable instructions that, when executed by the at least one processor, cause the UE to:

receive a Radio Resource Control (RRC) configuration indicating a first Control Resource Set (CORESET) pool index associated with a Physical Uplink Control Channel (PUCCH) designated to carry Uplink Control Information (UCI);

determine whether the PUCCH overlaps one or more Physical Uplink Shared Channels (PUSCHs) in time domain;

after determining that the PUCCH overlaps at least one of the one or more PUSCHs in the time domain, multiplex the UCI on a particular PUSCH of the one or more PUSCHs that is associated with the first CORESET pool index; and transmit the multiplexed UCI via the particular PUSCH.

12. The UE according to claim 11, wherein the one or more computer-executable instructions, when executed by the at least one processor, further cause the UE to:

drop a transmission of the PUCCH after determining that the PUCCH overlaps the at least one of the one or more PUSCHs in the time domain.

13. The UE according to claim 11, wherein:

the RRC configuration further indicates a second CORESET pool index, the first CORESET pool index is associated with a first Transmission Reception Point (TRP), and the second CORESET pool index is associated with a second TRP.

14. The UE according to claim 11, wherein the PUCCH is scheduled for a dynamic PUCCH transmission.

15. The UE according to claim 11, wherein the PUCCH is scheduled for a transmission of a PUCCH repetition.

16. The UE according to claim 11, wherein each PUSCH of the one or more PUSCHs is scheduled by a respective Physical Downlink Control Channel (PDCCH).

17. The UE according to claim 11, wherein the particular PUSCH is scheduled for a transmission of a PUSCH repetition.

18. The UE according to claim 11, wherein the one or more computer-executable instructions, when executed by the at least one processor, further cause the UE to:

transmit the one or more PUSCHs according to a predetermined sequential order in a beam sweeping cycle after determining that the PUCCH overlaps the at least one of the one or more PUSCHs in the time domain, wherein each PUSCH of the one or more PUSCHs is associated with a respective beam.

19. The UE according to claim 11, wherein the one or more computer-executable instructions, when executed by the at least one processor, further cause the UE to:

transmit the one or more PUSCHs according to a predetermined cyclic order in a beam sweeping cycle after determining that the PUCCH overlaps the at least one of the one or more PUSCHs in the time domain, wherein each PUSCH of the one or more PUSCHs is associated with a respective beam.

20. The UE according to claim 11, wherein the UCI includes Hybrid Automatic Repeat Request (HARQ)-Acknowledgment (ACK) information.

\* \* \* \* \*